Feb. 14, 1956 J. A. V. TURCK 2,734,683

TOTAL TRANSFER MECHANISM

Original Filed July 16, 1943 12 Sheets-Sheet 1

Inventor
Joseph A. V. Turck
BY
Sheridan, Davis & Cargill
Attys.

Feb. 14, 1956 J. A. V. TURCK 2,734,683

TOTAL TRANSFER MECHANISM

Original Filed July 16, 1943 12 Sheets-Sheet 2

Inventor.
Joseph A. V. Turck
By
Sheridan, Davis & Cargill
Attys.

Feb. 14, 1956 J. A. V. TURCK 2,734,683
TOTAL TRANSFER MECHANISM
Original Filed July 16, 1943 12 Sheets-Sheet 3

Inventor
Joseph A. V. Turck
BY
Sheridan, Davis & Cargill
Attys

Feb. 14, 1956 J. A. V. TURCK 2,734,683

TOTAL TRANSFER MECHANISM

Original Filed July 16, 1943 12 Sheets-Sheet 4

Inventor:
Joseph A V. Turck
By Sheridan, Davis & Cargill
Attys.

Feb. 14, 1956 J. A. V. TURCK 2,734,683

TOTAL TRANSFER MECHANISM

Original Filed July 16, 1943 12 Sheets-Sheet 5

Inventor:
Joseph A. V. Turck
By
Sheridan, Davis & Cargill
Attys.

TOTAL TRANSFER MECHANISM

Inventor:
Joseph A. V. Turck
By Sheridan, Davis & Cargill
Attys.

TOTAL TRANSFER MECHANISM

Original Filed July 16, 1943 12 Sheets-Sheet 7

Inventor
Joseph A. V. Turck
By
Sheridan, Davis & Cargill
Attys.

Feb. 14, 1956 J. A. V. TURCK 2,734,683

TOTAL TRANSFER MECHANISM

Original Filed July 16, 1943 12 Sheets-Sheet 8

Inventor

Joseph A. V. Turck

BY

Sheridan, Davis & Cargill

Attys.

TOTAL TRANSFER MECHANISM

Original Filed July 16, 1943 12 Sheets-Sheet 9

Inventor.
Joseph A. V. Turck
BY
Sheridan, Davis & Cargill
Attys.

Inventor.
Joseph A. V. Turck
By
Sheridan, Davis & Cargill
Attys.

Feb. 14, 1956 J. A. V. TURCK 2,734,683

TOTAL TRANSFER MECHANISM

Original Filed July 16, 1943 12 Sheets-Sheet 11

Inventor
Joseph A. V. Turck
By
Sheridan, Davis & Cargill
Attys.

Feb. 14, 1956 J. A. V. TURCK 2,734,683

TOTAL TRANSFER MECHANISM

Original Filed July 16, 1943 12 Sheets-Sheet 12

Inventor
Joseph A V. Turck
By
Sheridan, Davis & Cargill
Attys.

United States Patent Office 2,734,683

Patented Feb. 14, 1956

2,734,683

TOTAL TRANSFER MECHANISM

Joseph A. V. Turck, Miami Beach, Fla., assignor to Felt & Tarrant Manufacturing Company, Chicago, Ill., a corporation of Illinois

Original application July 16, 1943, Serial No. 494,907. Divided and this application August 14, 1950, Serial No. 179,206

15 Claims. (Cl. 235—62)

This invention relates in general to calculating machines, having more particular reference to key-responsive, multi-order, power driven machines capable of both positive and negative forms of calculation, and is a division of my copending application Serial No. 494,907, filed July 16, 1943, now Patent No. 2,527,467.

A principal object of this invention is to facilitate the accurate and reliable transfer of totals registered in a primary register to a secondary register or super-totalizer to accumulate answers resulting from several calculating operations.

The instant calculating machine is of the super-totalizer type embodying two registers or accumulators, each of which is provided with denominational numeral wheels and tens transfer mechanism having tens carrying springs in each denominational order tensioned by accumulative actuation of the associated numeral wheel to effect a carrying action by imparting a unit actuation to the numeral wheel of the next higher denominational order, and wherein clearing or zeroizing of each register is accomplished selectively by a gear-detraining movement of the register to permit such carrying springs to return their associated numeral wheels to zero position.

In prior art machines of this type, in which the transfer of totals from a primary to a secondary register is accomplished by clearing of the primary register, after operatively interconnecting the same with the secondary register, operational difficulties have been encountered because the tens carrying springs of the primary register comprise the source of power for actuating the secondary register, and such actuation of the secondary register requires tensioning of its tens carrying springs.

An important object of this invention, therefore, is the provision of auxiliary power supply means for effecting such total transferring operations, whereby tens carrying springs of the same strength may be employed in both the primary and secondary register.

Another object is to effect an extra speedy return to zero of the numeral wheels of the primary register during a transfer operation of its total to the wheels of the secondary register by operation of such auxiliary power supply means.

A further object of the invention is the provision of such auxiliary power supply means which comprises power storage means for storing power for actuating the secondary register and assisting the carrying springs of the primary register to zeroize the numeral wheels thereof, and auxiliary power mechanism for reconditioning such power storage means whenever the power stored therein is depleted or diminished.

Another object is to provide transfer gearing in such a super-totalizer machine normally inoperative so as not to interfere with an independent zeroizing operation of the primary register and selectively settable to operative position for interconnecting the secondary register with the primary register as the latter is moved in a zeroizing operation out of engagement with its denominational actuating mechanisms.

A further object of the invention is to provide selectively operable manipulative control members for respectively conditioning the secondary register for total transfer operations by movement of such transfer gearing into operative position, and for selectively effecting zeroizing of either of the two registers.

Another object is to so dispose the two manipulative control members for conditioning the secondary register to receive a total transfer, and for effecting zeroizing of the primary register, respectively, as to facilitate serial operation thereof with one hand.

Another object of the invention is to condition the auxiliary power mechanism by operation of the transfer control member for actuation by the power unit of the machine in response to subsequent operation of the primary register zeroizing control member.

A further object of the invention is to prevent misoperation of such a machine by providing interlocking mechanism for preventing operation of the transfer control member or the zeroizing control member for the secondary register during operation of the zeroizing control member for the primary register, and for preventing operation of the zeroizing control member for the secondary register upon movement of the transfer control member to operative position, together with means for releasing the transfer control member after movement thereof to operative position if the machine operator then decides not to effect a total transfer.

A further object of the invention is the provision in such a super-totalizer machine of means for selectively rendering the transfer gearing in a predetermined number of denominational orders ineffective, while moving such transfer gearing in the remaining denominational orders to operative position, to cause a partial transfer of the total in the primary register to the secondary register.

Numerous other objects and advantages of the invention will be apparent as it is better understood from the following description, which, when taken in connection with the accompanying drawings, discloses a preferred embodiment thereof.

For the purpose of illustrating the invention the drawings show a key-responsive, multi-order, power driven calculating machine like those disclosed in United States Letters Patent No. 1,391,220, issued September 20, 1921, and No. 2,063,962, issued December 15, 1936. It is not, therefore, deemed necessary to repeat herein the detailed disclosure of those patents. It may be well, however, by way of explanation to point out parts and operation of such machines which will assist in an understanding of the instant invention.

Figure 3:
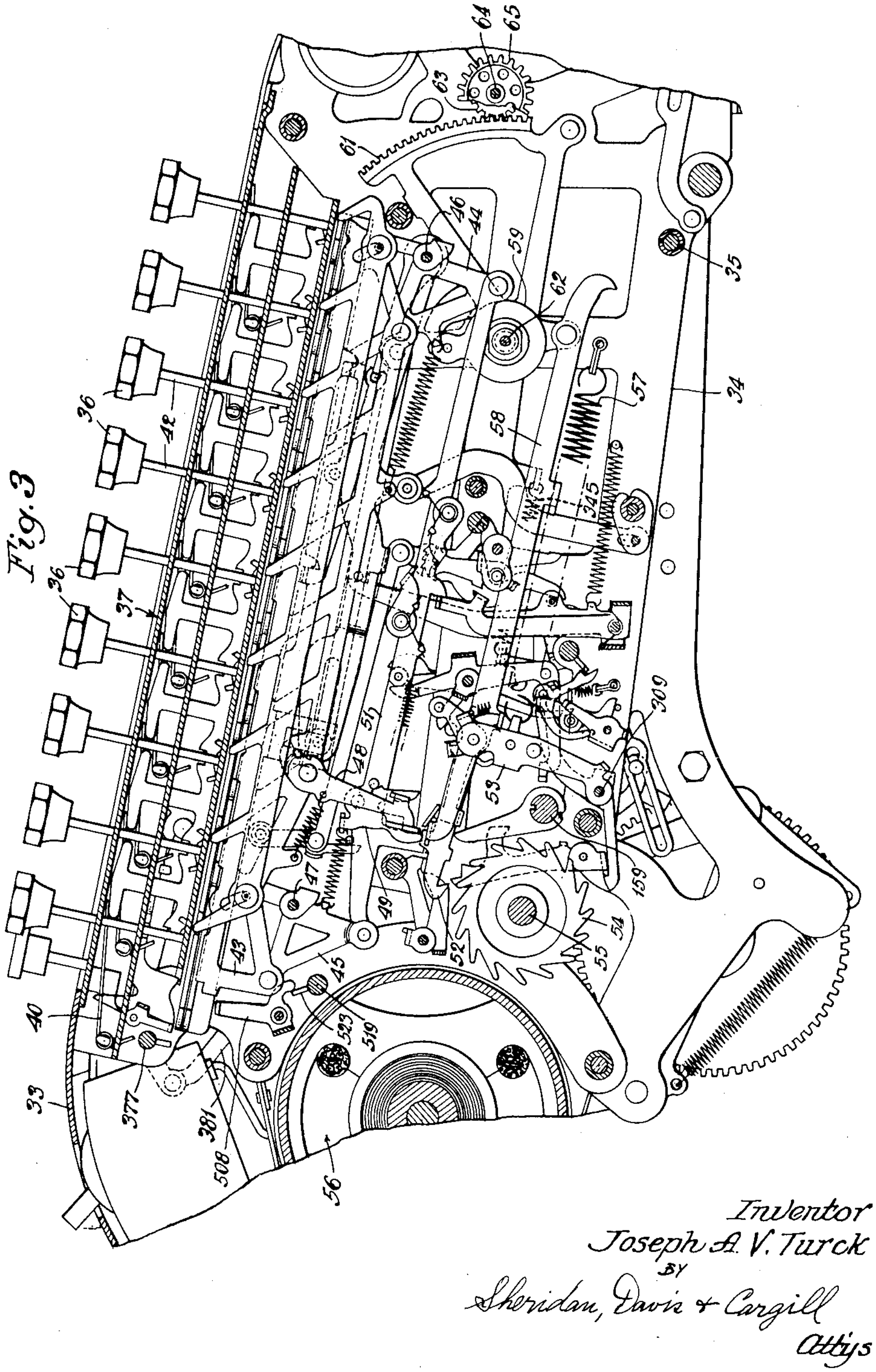
Fig. 3 is a fragmentary longitudinal section of a calculating machine embodying the invention taken along a plane adjacent a column of digital keys.
Figures 4, 8:
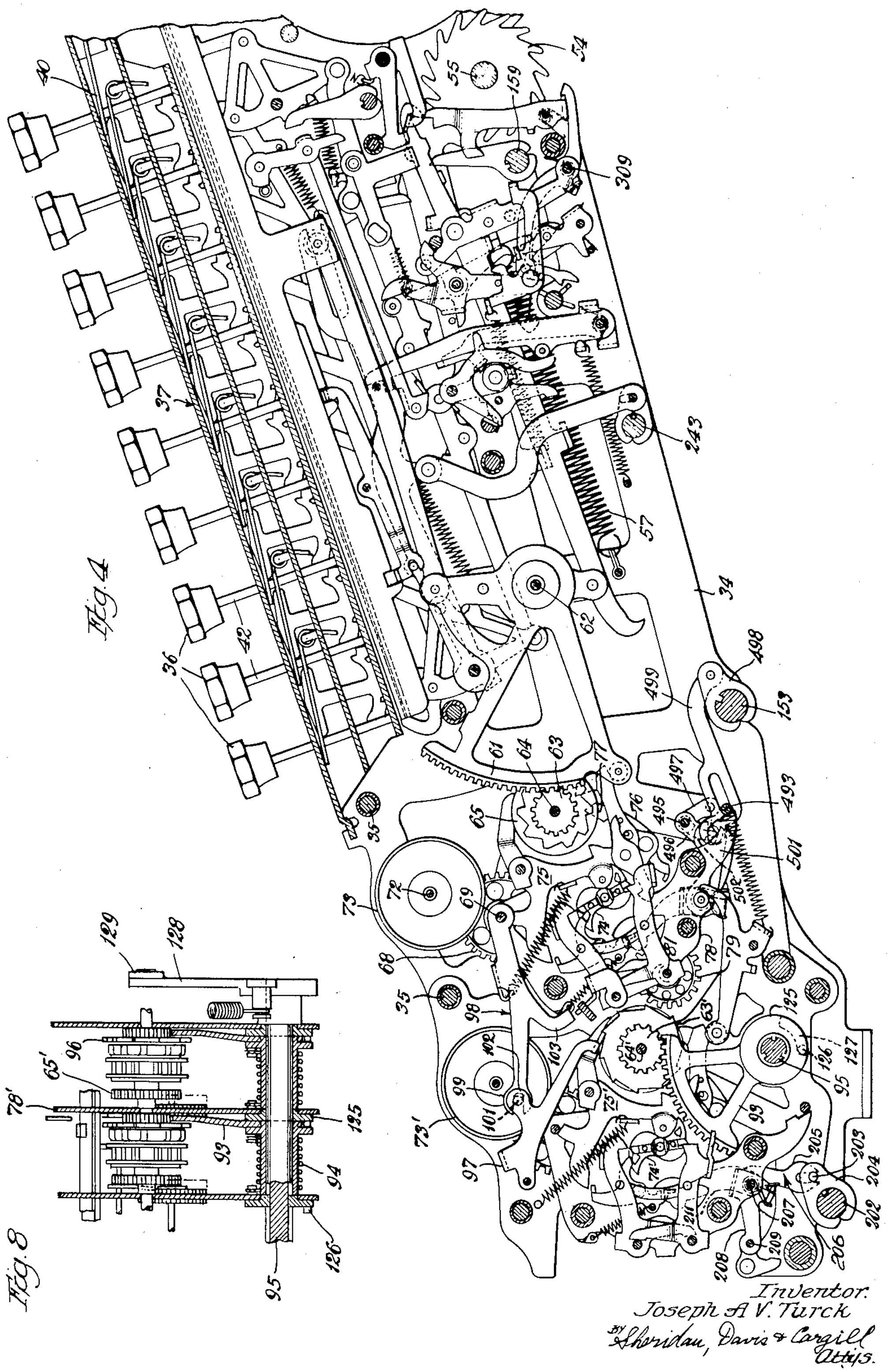
Fig. 4 is a fragmentary longitudinal section of the calculating machine shown in Fig. 1 taken on a plane adjacent a column of digital keys.
Fig. 8 is a transverse sectional detail showing a portion of the supplemental or secondary register.
Figures 9, 10:
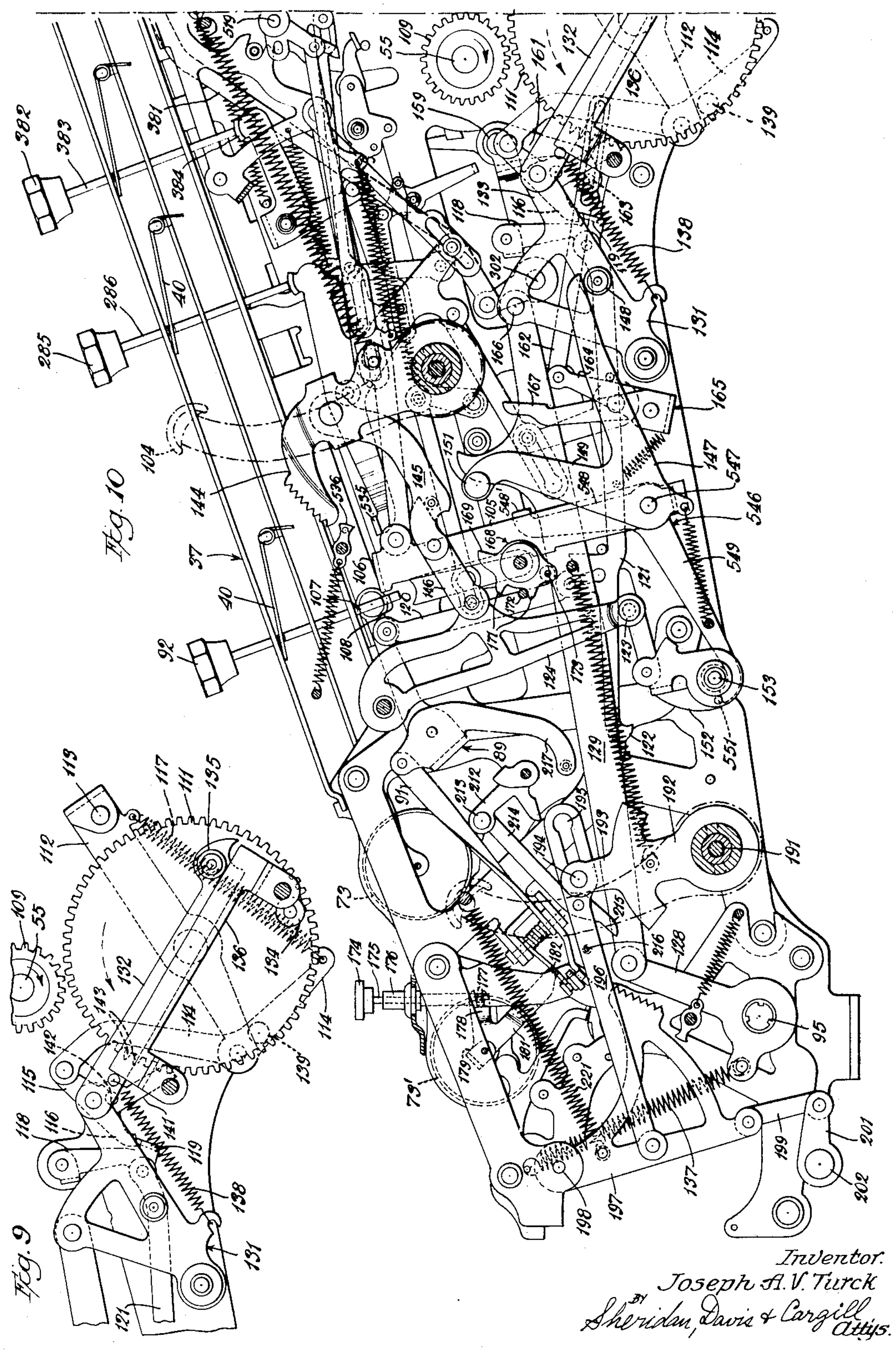
Fig. 9 is a fragmentary detail view of the driving means for the actuating sectors of the secondary register.
Fig. 10 is a longitudinal section showing a portion of the novel calculating machine and taken at the right side thereof to bring out certain details of the transfer and subtraction control means.

The various instrumentalities of such a machine are provided with a suitable outer casing 33 wherein they are mounted on skeleton frame members or partition plates 34 disposed between the actuating mechanisms of the several denominational orders and secured together in spaced relationship by suitable tie rods 35. As shown in Figs. 1 to 4 a plurality of rows or columns of digital keys 36 are provided with depending stems which are slidably arranged through a keyboard 37. The keyboard 37 as illustrated includes an upper plate 38, a lower plate 39 spaced therefrom, and an intermediate plate 41 disposed between and in spaced relationship to the upper and lower plates, and the keyboard is positioned to serve as a part of the upper wall of the casing 33. The digital keys 36 are normally individually held in their upper position by springs 40, which, as shown in Figs. 3, 4 and 10 are arranged between the upper and intermediate key plates 38 and 41.

It will be understood that the keys 36 serve to initiate the operation of multi-order actuating mechanism for a multi-order accumulator mechanism or register. One order of actuating mechanism is associated with each of the columns of keys and with each order of accumulator mechanism, whereby, responsive to key operation, the accumulator mechanism is actuated by the actuating mechanism. While no two keys 36 of the same column or denominational order may be operated simultaneously, any key of one order may be operated at the same time as any key of each of one or more other denominational orders.

In such a machine upon depression of a digital key 36 in any column of keys, its stem 42 engages and depresses a parallel motion bar 43 associated with that column of keys and pivoted at its forward and rear ends to levers 44 and 45, respectively. Those levers 44 and 45 are in turn pivotally carried on front and rear shafts 46 and 47 which extend through and are supported by the partition plates 34. The depression of the parallel motion bar in any denominational order of the machine operates a power trip mechanism in the same order, which includes a spring held dog 48 and a spring biased latch 49. Each dog 48 and its associated latch 49 are pivotally mounted in cooperative relationship on the parallel motion bar 43 and a power trip bar or link 51, respectively, in the same denominational order. The power trip bars or links 51 extend between and are pivoted at their opposite ends to the levers 44 and 45.

When any power trip mechanism is so operated by depression of one of the keys 36 in the associated column of keys, the power trip mechanism operates an associated power clutch in the same order, including a clutch hook 52 pivoted at one end to a pivoted upstanding guide arm or member 53 and a clutch or toothed wheel 54. All of the clutch wheels 54 are fixed on a transordinal power shaft 55 which is suitably connected to an electric motor 56 for rotating the shaft 55 to rotate the clutch wheels 54 in a counter-clockwise direction as viewed in Fig. 3. The operation of the power clutches by the power trip mechanisms causes each clutch hook 52 to engage a tooth of the associated rotating clutch wheel 54. When so engaged the clutch hook swings the associated guide arm 53 in a counter-clockwise direction (Fig. 3) until a tooth following that engaged by the clutch hook 52 engages the shank thereof and cams the hook upward out of engagement with the clutch wheel 54, thus ending a power stroke or action in the machine.

In so swinging any pivoted guide arm 53 rearwardly or counterclockwise in any denominational order of the machine, the motor 56 through the power clutch and the guide arm tensions or energizes a calculating spring 57 anchored at its forward end to the partition plate 34 and secured at its rear end to the guide arm 53. As a result of the energization of the spring 57 as just described, the spring will swing the pivoted guide arm 53 forwardly in a clockwise direction when the clutch hook 52 is disengaged from the clutch wheel 54 at the end of the power stroke.

Thus the pivoted guide arm 53 in the order associated with the depressed key is oscillated or rocked by the motor 56 and the spring 57 when the key is depressed, moving in one direction under the driving power of the motor to energize the spring, and being moved in the opposite direction by the spring to provide the driving force for that order of actuating and accumulating mechanisms to effect calculation. The oscillatory or rocking movement of each pivoted guide arm is transmitted through an actuating link 58, pivotally connected at its rear end to the guide arm and at its forward end, by a yielding clutch or compensating device 59, to a rack or gear sector 61 mounted on a transordinal shaft 62 extending through the partition plates 34, as described in United States Letters Patent No. 2,287,151, issued June 23, 1942.

The gear sector or gear sectors 61 are swung downwardly in a clockwise direction (Fig. 3) during the power stroke and the extent of such downward movement is limited responsive to key operation enabling the gear sector or sectors 61 upon return to impart the degree of digital advancement to the accumulator mechanism, which corresponds in each operated order to the particular key 36 depressed in that order. The compensating device 59 permits the continuation of the rearward movement of the link 58 after downward movement of the section 61 has been stopped and until the end of the power stroke when the clutch hook 52 in each effective order is automatically disengaged from its associated clutch wheel 54. When so disengaged the calculating spring moves the link or links 58 forwardly (Fig. 3), and the compensating device 59 in each effective order permits movement of the parts in reverse direction after the gear sector or sectors 61 have been returned to their normal positions and until the link or links 58 have been moved forwardly to their initial positions.

Each gear sector 61 responsive to the keys 36 in the associated column of keys is thus operable to rotate an accumulator actuating pinion 63, one such pinion being provided in each order of the machine on a transverse shaft 64 common to all of the pinions 63 and supported by the partition plates 34. Rotation of each pinion 63 is transmitted through an internal ratchet mechanism (not shown) to a combined lantern wheel and accumulator gear 65 also on the shaft 64. The gear of each combined lantern wheel and accumulator gear meshes with a carrying gear 66 (Fig. 5) journaled on a transverse shaft 67 which is parallel to the shaft 64. Besides meshing with the lantern wheel and accumulator gear 65, each carrying gear 66 meshes with an intermediate gear 68 journaled in the same order on a transverse shaft 69, and that intermediate gear in turn meshes with a numeral wheel pinion 71 journaled in the same order on a transverse shaft 72 and fixed to a numeral wheel 73.

For imparting a digital unit of actuation in each order of accumulator mechanism above the units order, whenever a tens transfer is to take place from the next lower denominational order of the accumulator, carrying mechanism is provided in the machine. Such mechanism is fully disclosed in United States Letters Patent No. 1,357,747 and 1,357,748, both issued November 2, 1920, and therefore will be only briefly described herein. The carrying mechanism includes a carrying cam member 74 which is rotated 180 degrees by a spring for each tens transfer that is to be effected. Each carrying cam member 74 is adapted to swing a bell crank carrying lever 75 in a counterclockwise direction as viewed in Fig. 4. Such swinging of the carrying lever 75 causes a carrying pawl 76 pivotally mounted thereon and having an actuating or engaging end 77 (Fig. 30) to rotate the combined lantern wheel and accumulator gear 65 a sufficient distance to impart through the above described train of gears 66, 68 and 71 a digital unit of actuation to the number wheel 73.

The carrying mechanism just referred to, the gears 66, 68 and 71, the numeral wheels 73, and the shafting for such gears and numeral wheels are included in the registering mechanism which shall hereinafter sometimes be called for convenience the primary register. That primary register includes a rock frame having a plurality of spaced frame plates 78 pivoted to swing or rock about the transverse shaft 69 in a clearing or zeroizing action and supporting the transverse shaft 67 on which is mounted the carrying gears 66.

Thus far the description applies alike to the single register type as well as to the super-totalizer type of calculating machine. By referring to Figs. 1, 4 and 5, however, it will be noted that the super-totalizer type of machine includes, in addition to the instrumentalities already referred to, another or secondary register. Like the above described primary register, the secondary register includes in each denominational order a combined lantern wheel and accumulator gear 65' on a shaft 64' common to all of those combined lantern wheels and accumulator gears, a carrying gear 66' meshing with the gear 65' and on a shaft 67' common to all of those carrying gears, an intermediate gear 68' meshing with the carrying gear 66' and on a shaft 69' common to all of those intermediate gears, a numeral wheel pinion 71' meshing with the intermediate gear 68' and on a shaft 72' common to all such pinions, a numeral wheel 73' fixed to each numeral wheel pinion 71', and carrying mechanism with a carrying cam 74', a bell crank carrying lever 75' and a carrying pawl 76' (Fig. 30) having an actuating or engaging end 77' functioning respectively like the similarly designated parts of the primary register as just described.

Also like the primary register, the secondary register includes a rock frame having a plurality of spaced frame plates 78' pivoted to swing or rock about the transverse shaft 69' during a clearing or zeroizing operation of the secondary register and supporting the transverse shaft 67' on which is supported the carrying gears 66'. The primary and secondary registers are arranged in tandem relationship somewhat as in the aforesaid United States Letters Patent No. 1,391,220. As so arranged a sliding or shifting gear 79 mounted in each rock frame section of the primary register on a lower detent shaft 81 is at all times engaged with one of the carrying gears 66 of each order. The gears 79 are shiftable or slidable axially of the shaft 81 sufficiently to engage the gears 65' of the combined lantern wheels and accumulator gears in the secondary register, when the primary rock frame is swung forward about its pivot shaft.

Those shifting gears 79 (Figs. 4, 5 and 6), sometimes called the transfer gears, are so mounted on the lower detent shaft 81 of the primary rock frame that they turn with the carrying gear 66 of the same orders whenever a zeroizing action occurs in the primary register. The transfer gears 79 during a zeroizing action of the primary rock frame are normally too far to the left to engage the gears 65' of the secondary accumulator wheels and therefore no transfer from the primary to the secondary register occurs when the primary rock frame is swung forward in its zeroizing action.

Figures 5, 6:
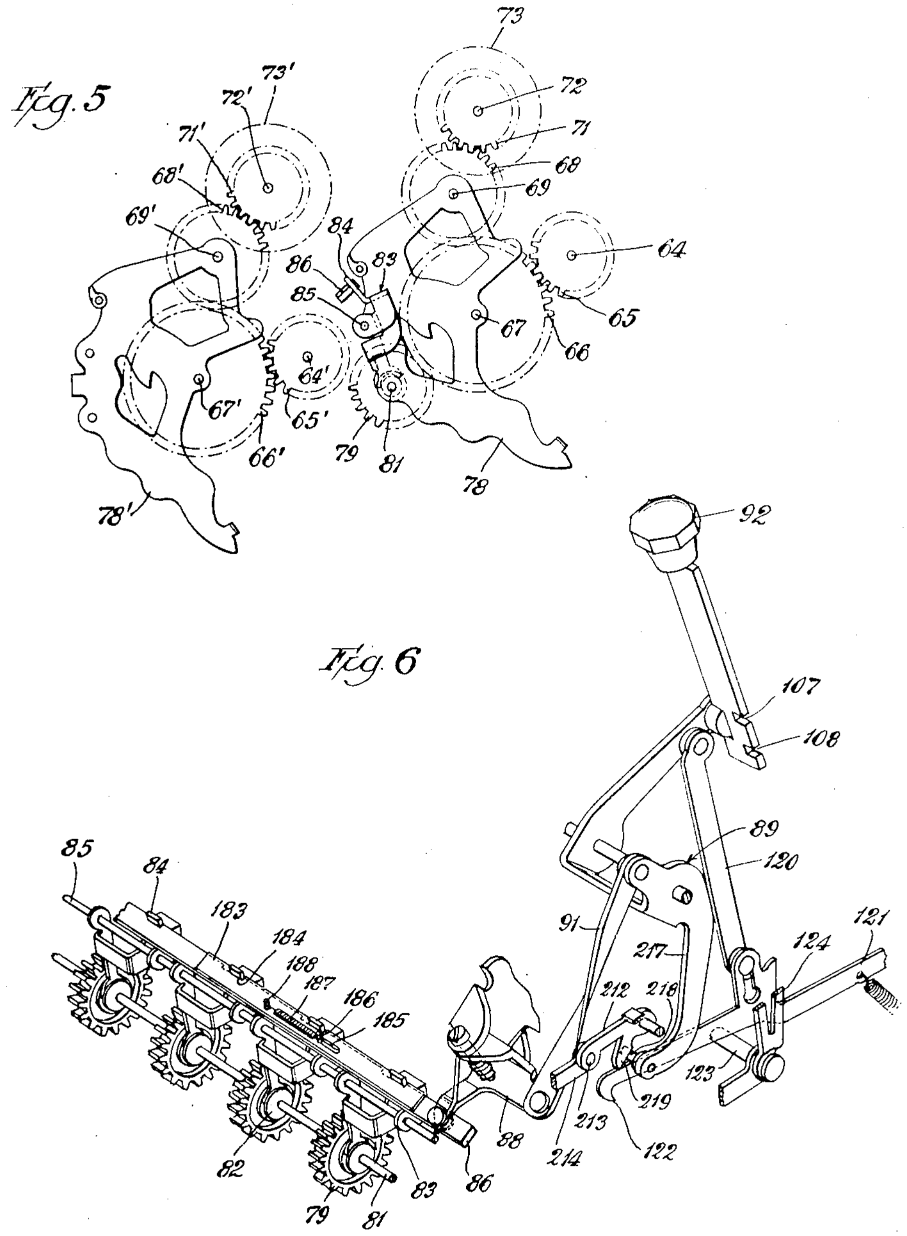
Fig. 5 is a side view of the trains of gears included in the primary and secondary registering mechanism.
Fig. 6 is a perspective view of the mechanism controlling the transfer of numbers from the primary to the secondary registering mechanism.
Figure 7:
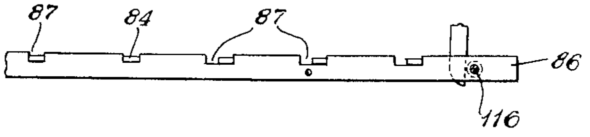
Fig. 7 is a plan view of the shifting bar employed in the transferring mechanism illustrated in Fig. 6.

In the illustrated machine the transfer gears 79 serve to connect the two registers together and to transfer the total of the primary wheels to the total of the secondary wheels when desired during the zeroizing of the primary register. To that end means is employed to shift the gears 79 to a position for such a transfer. As shown in Figs. 5, 6 and 7, they are shiftable to the right sufficiently to mesh with the wheel gears 65' when the primary rock frame is swung forwardly on its pivot shaft 69. To accomplish this the hub of each gear 79 is so formed as to provide a groove 82 in which a shifting fork 83 engages to move the gears axially to and from alignment with the respective gears 65' without disengaging the gears 79 from the carrying gears 66. Each shifting fork 83 is provided with a lug 84 curved on a radius with the pivot shaft 69 of the primary rock frame and is slidably mounted on an upper detent shaft 85.

As means for shifting all of the gears 79 as a unit, a notched flat rod 86 having spaced notches or slots 87 therein is slidably arranged in and supported by openings in the framework provided for supporting the secondary register so that the curved lugs 84 of the shifting forks 83 pass through the notches 87 of the flat rod 86. That flat rod 86 extends across the machine transordinally and is operable by a lever 88. The lever 88 is connected to another lever 89 by a link 91, and a transfer key 92 with a stem passing through the keyboard 37 is arranged to operate the described train of levers and links to shift the flat rod 86 to the right (Fig. 6).

Thus the transfer key 92 during downward movement shifts all the transfer gears 79 from left to right where they will still be in engagement with the respective carrying gears 66 of the primary register and in such a position laterally in their orders that when a zeroizing action of the primary register is produced the forward rocking of the primary rock frame will move the transfer gears 79 into engagement with the respective gears 65' of the secondary register. The carrying spring action utilized in the primary register to return the carrying gears 66 and their numeral wheels 73 to zero as described in the aforesaid Patent No. 2,063,962 transmits a torque to the combined lantern wheels and accumulator gears 65' through their geared connection with the transfer gears 79, tending to turn the wheels and gears 65'. Since a like carrying spring in the secondary register produces a like torque in the opposite direction, the one spring action resists the other and no action under such conditions will take place.

In the operation of the primary register as in the machine described in the patent just mentioned above, accumulation is produced through a gear pinion and ratchet movement by action received from one or more actuating gear sectors 61. Similar means are provided herein for actuation of the secondary register. Such means is in the form of spring actuated gear sectors 93 (Figs. 4 and 8) with coil springs 94 on a three-grooved transordinal shaft 95 to actuate the denominational orders of the secondary register through the combined lantern wheels and accumulator gear 65'. The springs 94 provide power to overcome the resistance of the secondary register to the above described torque from the primary register carrying spring action.

Novel means is employed to prevent the gear sectors 93 from normally operating the secondary register and turning its numeral wheels. Such means comprises a plurality of toothed detent wheels 96, one for each denominational order of the machine, and associated pivoted detents 97 (Figs. 4 and 8) operable by lifting levers 98, each lever 98 being provided with a jaw 99 operating on a pin 101 in an arm 102 of the associated detent 97. That detent or locking arrangement serves to prevent any of the stored auxiliary power in the springs 94 from being expended until such time as the secondary register detent wheels 96 are unlocked which occurs contemporaneously with the forward swinging of the primary rock frame in a zeroizing actuation. At that time the curved arms 84 of the shifting forks 83 swing about the pivot 69 of the primary rock frame and in shifted position engage with downwardly projecting arms 103 of the levers 98, throwing the detents 97 out of their detent wheels 96. When that occurs the super-totalizer or secondary register is free for operation by the auxiliary gear sectors 93, the degree of action being controlled by the distances rotated during the return of the primary numeral wheels to zero.

From the foregoing description it will be understood that the zeroizing of the primary register by a zeroizing lever 104 is effected at the same time that the total transfer key 92 is pressed. The transfer key 92 and the zeroizing lever 104 are so arranged that the former may be depressed with the thumb, and the forefinger may be utilized to operate the latter. Such coordination of those who manipulative devices brings about a transfer. Without such coordination the transfer gears 79 will not engage the gears 65' of the secondary register at the proper moment.

To assure such coordination a locking lever 105 is provided with a bent lip 106 at its upper end (Fig. 10) and is pivoted at its lower end so that the bent lip 106 will cooperate with an upper notch 107 and a lower notch 108 in the stem of the transfer key 92. When the zeroizing handle 104 is pulled forward without depressing the transfer key 92, the lip 106 will pass through the lower notch 108 of the transfer key stem. The transfer key 92 will thus be locked against depression while the zeroizing handle is pulled forward and remains locked against depression until the zeroizing handle returns to its normal position. When the transfer key 92 is depressed before the zeroizing handle is pulled forward, the bent lip 108 will pass through the upper notch 107 of the transfer key stem during the forward movement of the zeroizing handle. The transfer key 92 will thus be held down until the zero action is completed.

Thus the transfer gears 79 are shifted to the right (Fig. 6) where they will engage the gears 65' of the secondary register when the transfer key 92 is depressed and zeroizing lever 104 is moved forward. During the resulting forward swing of the primary rock frame the curved arms 84 moving therewith release the locking detents 97 so that the auxiliary gear sectors 93, through the tension of their springs 94, may operate the secondary register accumulator wheels, whereby to accelerate the normal return of the primary numeral wheels to zero. To overcome the resistance of the secondary register to the torque of the carrying spring action of the primary register, means is provided for automatically storing power in the gear sector springs 94 after the transfer has been accomplished and for resetting the gear sectors 93 to their normal position. To that end the power drive shaft 55 is provided with a gear pinion 109 (Figs. 9 and 10) beneath which a larger spur gear 111 is rotatably mounted on a swinging arm 112 pivoted at 113 to the frame of the machine. The arm 112 has an extension beyond the pivotal mounting of the gear 111 to which is pivotally connected a toggle lever action consisting of levers 114 and 115, the lever 115 having a toggle trigger arm 116. The toggle levers 114 and 115 extend between the arm 112 and a stud fixed in the frame and the toggle is operated by a spring 117. When the toggle is made up the gear 111 will be lifted into engagement with the pinion gear 109 which normally by its motion immediately starts counter-clockwise movement of the gear 111 (Figs. 9 and 10).

That toggle action 114 and 115 is normally held against making (through the action of its spring 117) by the action of a latch arm 118 pivotally mounted on the frame of the machine. The latch arm 118 is provided with a latch lug 119 for co-acting with the trigger arm 116 of the toggle lever 115 to latch the toggle against operation by its spring 117. The latch arm 118 is provided with a pickup link 121 extending forwardly toward the front of the machine and provided at its forward end with a hook 122. The link 121 is normally supported by an upwardly extending link 120 attached at its upper end to the lever 89 of the transfer gear shifting mechanism by a pivot stud as shown in Fig. 6 and is attached to the pickup link 121 by a stud at its lower end operating in a slot arranged to receive the stud.

The transfer key 92 when depressed lowers the link 120 and allows the pickup link 121 to drop at its front end so that a pin 123 in the lower end of a zero lever 124 of the zeroizing mechanism may pick up the hook 122 of the pickup link 121. As the pin 123 moves forwardly in a clearing or zeroizing operation it causes the pickup link 121 to be drawn forwardly and the latch lug 119 to be pulled out from under the toggle trigger 116, thus allowing the toggle to make up and produce engagement of the gears 109 and 111.

The auxiliary gear sectors 93 are rotatably mounted on the three grooved shaft 95 (Figs. 4 and 8), the grooves of which form key ways for disks 125 which carry pins 126 and which rock with the shaft 95. Those disks are mounted or journaled in holes in the frame plates which support the secondary register and provide bearings for supporting the shaft 95 in the frame. The pins 126 fixed in the disks 125 are arranged to act in a recess or cutaway portion 127 of the hub of the auxiliary gear sectors 93. When in their normal position as shown in Fig. 4 the pins 126 allow the sectors 93 to act individually under the force of the springs 94 to rotate the sectors clockwise as disclosed in Fig. 4. Such clockwise rotation of the sectors 93 depletes the force of their springs 94 according to the extent of clockwise movement. When, however, a transfer has taken place a lever 128 fixed to the right end (Fig. 8) of the shaft 95 is rotated counter-clockwise from the position disclosed in Fig. 10 rotating with it the shaft 95 and the disks 125. Such rotation of the disks 125 causes their pins 126 drivingly to engage the right ends of the recesses 127 in the respective gear sectors 93 of the secondary register which have been displaced by a transfer and to restore those gear sectors to their normal positions and to re-energize the springs 94.

Such movement of the lever 128 is accomplished through a link 129 pivotally attached to the upper end of the lever 128, a lever 131 pivoted to its rear end, and a pickup link 132 attached to an arm 133 of the lever 131. This pickup link 132 is formed with a hooked free end arranged to receive a dolly roll 134 pivoted on the gear 111 as the dolly roll moves upwardly or counter-clockwise with the gear 111 when engaged with its pinion 109. Thus when an engagement of the gear 111 and its pinion 109 is effected through the toggle 114, 115 as already described, the roll picks up the hooked or free end of the pickup link 132 and carries it around in a pitman-like action until a roll 135 mounted on the free end of the pickup link 132 engages the forward end of a guide rail 136 fixed to the right support or outside frame plate of the machine. When that occurs the action of the gear 111 disengages the roll 134 from the pickup link 132 and the train of auxiliary gear sector resetting and sector spring tension mechanism returns to normal through the action of a spring 137 (Fig. 10) which acts between a connection with the framework and an arm of the lever 128 on the sector shaft 95.

During the power action just described the levers 128 and 131 are so operated through the links 129 and 132 as to cause the automatic resetting of the gear sectors 93. At the end of the pitman-like action after disengagement of the roll 134 from the pickup link 132, a spring 138 acts to hold the pickup link roll 135 against the guide rail 136 where it comes to rest in the normal position shown in Fig. 9 ready for another power action.

On the side of the gear 111 opposite that disclosed in Fig. 9 is a pin 139 which engages an arm 141 of the toggle lever 115 during rotation of gear 111 and causes the lever 115 to be turned clockwise on its pivot 142 in the frame. Such clockwise turning of the lever 115 breaks the toggle action which holds the gear 111 in engagement with its rotating pinion 109 and forces the toggle trigger 116 to re-engage the latch lug 119 of the latch arm 118 which holds the toggle against the makeup action of the spring 117.

But for the provision of novel means, the gear 111 would not be rotated far enough by the gear 109 in each cycle of operation to cause the latching of the toggle as just described to terminate such cycle, and therefore the gears would continue to re-engage and disengage rapidly following initiation of such cycle in the manner above described. To assure the necessary cycle terminating action the gear 111 is provided with two extra-long teeth 143 which are so arranged that they will cause engagement between the two gears 109 and 111 after the other teeth on the gear 111 have cleared those of the pinion 109, thus giving extra motion to the gear 111 for latching the toggle trigger 116. The result of this extra-long tooth action is that it gives the gear 111 an extra flip after the other teeth have separated, thereby causing the pin 139 to continue its action against the arm 141 until it latches the toggle trigger 116 and until the pin 139 passes the arm 141 and until the gear 111 rotates something like one-eighth of a turn beyond the engagement of the long teeth 143 with the gear 109.

In the "Comptometer" disclosed in the Patent No. 2,063,962 aforesaid, when a zeroizing action is effected, the rock frame, which herein is the primary rock frame, is swung sufficiently in a direction to disengage the gears 66 from the gears 65, the numeral wheels are thus allowed to return to their zero position and are left in that position until further operation of the machine. In other words, the rock frame remains out until a key of the machine is depressed, whereupon the rock frame in its disengaged relation with its actuating mechanism is allowed to return to its engaged or active position through the breaking of the detaining toggle. According to that patent, the detaining toggle is broken by a power action causing the rock frame to return to its active position.

In the instant invention, however, the rock frame of the primary register is returned to normal or active position as soon as a transfer is made in order to leave the secondary accumulator wheels free to receive their carrying action. To provide for the return of the primary rock frame immediately following a transfer, a toggle or jointed linkage is employed between a zero lever segment 144 and the lever 124. With such a jointed linkage the primary rock frame may be returned to its active position even when the zero hand lever 104 is erroneously held forward during a zeroizing operation. Such jointed linkage comprises two arms 145 and 146 (Fig. 10) so joined at adjacent ends that they normally act like a rigid link with the joint below the center line between its two operating ends and with a stop arm and pin to limit its dropping lower. Associated with that jointed linkage is a lever 147 operable by the power action of a dolly roll 148 on the lever 131 as it is swung upwardly and forwardly under power. The lever 147 is provided with an upwardly extending arm 149 having a stud 151 adapted upon such operation of the lever 147 to engage the arm 145 of the jointed linkage 145 and 146 and to break the jointed linkage at its center.

With such a construction if the zeroizing hand lever 104 is drawn forward in a total transfer action and is misoperatively held forward, the jointed linkage will be broken at its center and permitted to double up, thus eliminating its action of preventing the return of the primary rock frame. The breaking action of the jointed linkage is so timed that it does not take place until after an actuating arm 152 on an actuating shaft 153 for the primary rock frame has been fully swung forward and the detaining toggle which holds the rock frame out in a transfer position is broken. The rock frame detaining toggle comprises a forward link 154 (Fig. 30) and a lever 155. The forward link 154 is pivoted at one end to an arm 156 fixed on the left end of the shaft 153 and is pivotally connected at its other end to an end of the lever arm 155 by a stud 157, the lever arm being pivotally supported on a short shaft 158 journaled in the frame of the machine. The breaking of the detaining toggle 154, 155 will allow the primary rock frame to return and the transfer gears 79 to clear the secondary or super-totalizer register, thus causing the jointed linkage 145, 146 to double up and to eliminate the resistance to the return of the primary rock frame to normal position after the primary register is cleared or zeroized.

Extending across the rear of the machine just below the power clutch hooks 52 and co-acting with the guide arms 53 is a transordinal rock shaft 159 (Figs. 3 and 4) provided with arms which normally contact with the guide arms 53 when the rock frame has been swung forward in a zeroizing action. The shaft 159 is equipped at its left end with a link action, including a link 160 (Fig. 30) connected at its forward end by a pivot stud 160′ to a suitable lever pivoted on the shaft 158, which, through engagement of stud 160′ with an arm 155′ of lever 155 during rearward movement of link 160, releases or breaks the rock frame detaining toggle 154, 155. At the right end of this shaft an arm 161 is fixed thereon and extends downwardly therefrom (Fig. 10). The arm 161 is connected by a slotted link 162 and a pin 163 at its lower end with a lever arm 164 of a lever 165. The head of a pivot stud 166 of the link 129 and lever 131 is so arranged that as the link 129 and lever 131 move forward in storing power for the gear sectors 93 of the secondary register the stud head 166 engages an arm 167 of the lever 165 imparting forward or counter-clockwise (Fig. 10) rotation to the lever 165 thereby giving a forward action through the arm 164 to the link 162. When the rear end of the slot in the link 162 engages the pin 163 the link 162 pulls the pin 163 and the arm 161 forwardly and upwardly giving an action to the shaft 159, similar to that which it receives in a power action upon depression of a key. Such action comprises rearward movement of link 160 which causes the primary rock frame detaining toggle 154, 155 to be broken and the rock frame to swing inward disengaging the secondary register whereby the carrying mechanism of the secondary register is free to operate.

To avoid interference with the return of the transfer mechanism to its normal position when the zeroizing hand lever 104 is held in its forward position resulting in holding the locking lever 105 in locking relationship with the transfer key 92, a transfer lock release lever 168 (Fig. 10) is pivotally mounted for limited oscillatory movement on the frame of the machine. The lever 168 is provided at its upper end with an operating lug or projection 169 and with spaced limiting lugs or projections 171 at opposite sides of a pin 172 in the frame of the machine. The operating lug 169 is adapted to be engaged by the stud 151 in the arm 149 of the toggle breaking lever 147 and to be rotated thereby in a counter-clockwise direction (Fig. 10). Rotational movement of the lever 168 is limited by the limiting lugs 171 and the pin 172. When the lever 168 is so rotated in a counter-clockwise direction a stud 173 in the lower end of the lever is adapted to engage the transfer lock lever 105 and move it in a clockwise direction (Fig. 10) whereby to remove the bent lip 106 of the lever 105 from the upper notch 107 in the stem of the transfer key 92 and to permit it to return to normal position.

It is sometimes desirable to split up the parts of a cent into thousandths in extension work. In such cases it is desirable to have the primary register accumulate such fractions and to eliminate the transfer of any part of a cent to the secondary register. Thus after extension work has been completed on the primary register if it reads .500 or a larger fraction, 1 is added to the fourth column of keys or 5 is added to the third column which will give the same result. The lower three orders are then prevented from making a transfer. To accomplish this desirable result a key 174 (Fig. 10) is provided with a stem 175 slidably disposed in a housing 176 suitably mounted in the outer case 33. The stem has in its lower end a pin 177 adapted to be engaged by the bifurcated end of an arm 178 of a blocking lever 179 mounted on the secondary register numeral wheel shaft 72'. The blocking lever 179 is also provided with a downwardly extending arm 181 having a lateral stop projection 182 formed on the lower end thereof and adapted to be disposed in the path of the curved lug 84 of the right or lowest order when the key 174 is depressed.

As shown in Figs. 6 and 7 the notches 87 of the shifting bar 86 in the three lowest denominational orders are of greater width than the notches 87 of the other higher denominational orders. Disposed upon the bar 86 is a similar but shorter bar or plate 183 having three notches 184 therein adapted to receive the curved lugs 84. The plate 183 has a slot 185 cut therein through which extends a pin 186 fixed to the lower shifting bar 86. A spring 187 attached at one end to the pin 186 and at the other end to a pin 188 fixed to the plate 183 provides sufficient tension normally to cause the plate 183 to shift with the bar 86. As shown in Fig. 6 the three right notches in the shifting bar 86 under the plate 183 are much wider than those to the left to permit movement of the bar 86 without moving the shifting forks 83 in the corresponding orders.

When it is desired however to prevent a transfer of totals from the three lowest denominational orders of the primary register mechanism to the associated denominational orders of the secondary register, the key 174 is depressed thus disposing the lateral projection 182 of the arm 181 in the path of the curved lug 84 in the units order. Depression of the transfer key 92 thereafter will cause lateral shifting from left to right (Fig. 6) of the bar 86 but the shifting forks 83 of the three lowest denominational orders will be held stationary by engagement of the stop projection 182 with the curved lug 84 and relative movement of the bar 86 with respect to the bar 183 is allowed against the tension of the spring 187 due to the wider notches 87 in the bar 86 associated with the three lowest denominational orders of the machine. Also the lugs 84 of the three lowest denominational orders not having been shifted into alignment with the arms 103 of the digital detent operating levers 98 the detents 97 of those three orders will not be released from the detents 96 of those denominational orders.

Thus the amount accumulated on the first three numeral wheels 73 of the primary register will be cleared and the first three numeral wheels 73' of the secondary register will not receive or accumulate any totals from the primary register.

Similar means are employed in zeroizing or clearing the super-totalizer or secondary register and the same general scheme of throwing the rock frame of the secondary register out and in is employed. The rock frame of the secondary register is under the control of the zeroizing lever 189 (Figs. 1 and 2) journaled on a short transverse shaft 191 which extends through the outer casing of the machine (Fig. 10). A zero lever 192 fixed to the inner end of the shaft 191 is provided with an upward extension 193 and a pin 194 fixed therein. The pin 194 is slidably disposed in a slot 195 formed in the rearward portion of a zero actuating link 196. At its forward end (to the left in Fig. 10) the link 196 is pivotally connected to the secondary rock frame actuating lever 197 which is rotatably mounted at its upper extremity on a stud 198 fixed to the frame.

The actuating lever 197 is articulately connected at its lower extremity to a short link 199 which in turn is connected to an arm 201. The arm 201 is fixed on a transordinal rock shaft 202 which is the secondary rock frame actuating shaft. A pin 203 (Fig. 4) fixed to an arm 204 rigidly mounted on the rock shaft 202 is disposed within the bifurcated portion of a depending arm 205 forming a part of a toggle lever 206 mounted on a transverse shaft 207 disposed in the secondary work frame. The toggle lever 206 is also provided with a forwardly extending arm 208 having an aperture in its forward extremity through which a transverse shaft 209 extends.

A zero stop lever 211 is mounted for pivotal movement on the transverse shaft 207 and is adapted when the secondary rock frame is swung outwardly to be projected into the path of a lug (not shown) riveted to the carrying gear to prevent further unwinding of the carrying gear spring. Short pivotal movement of the zeroizing lever 189 to the left as viewed in Fig. 2 will through the link and lever connection 196, 197 cause counter-clockwise rotation of the shaft 202 with a consequent outward swing of the secondary rock frame and disengagement of the carrying gears 66' and accumulator pinions 65' of the secondary register mechanism.

The secondary rock frame is maintained in its outward zeroized position by a detaining toggle until it is returned by depression of the transfer key 92 preparatory to a transfer operation. That detaining toggle comprises a rear toggle link 212 (Fig. 10) rotatably mounted on a stud in the frame. It is pivoted as at 213 to a front toggle link 214 which in turn is connected to the zero actuating link 196. When the actuating link 196 is moved forwardly or to the left as viewed in Fig. 10 by the action of the zeroizing lever 189 that link carries with it the front toggle link 214 which in turn causes counterclockwise rotation of the rear toggle link 212 until a forward extension 215 on the front link 214 contacts a stop stud or pin 216 fixed in the actuating link 196. The pivotal connected 213 between the links 212 and 214 is just slightly below center as shown in Fig. 6, when the extension 215 engages the stop stud 216. The rock frame and its actuating parts are thus effectively maintained in their outward or zeroized position.

Thus the rock frame detaining toggle 212, 214 for the secondary register is on the right side and is attached to the actuating mechanism provided for rocking the rock frame actuating shaft. The means for breaking the detaining toggle and letting the secondary rock frame move into active or accumulating position is controlled by the transfer key 92. With such construction, when the secondary register is cleared it remains out of engagement with its accumulator pinion 65' until its detaining toggle 212, 214 is broken by depression of the transfer key 92 which occurs before the rock frame of the primary register is swung into active or transfer position.

The means for breaking the detaining toggle upon depression of the transfer key 92 is shown in Fig. 6. As therein illustrated the lever 89 is provided with a downwardly extending curved arm 217 having a detaining toggle trip stud 218 fixed in the free end thereof. When the secondary rock frame is in an outward zeroized position the trip stud 218 is in engagement with a downwardly extending lug 219 formed on the rear toggle link 212. As already described depression of the transfer key 92 causes clockwise rotation of the lever 89 which results in similar movement of the rear toggle link 212 by engagement of the stud 218 with the lug 219, thus breaking the toggle 212, 214 and allowing the return of the secondary rock frame by a spring 221 (Fig. 10).

Thus the secondary register rock frame swings in before the primary register mechanism is engaged with the secondary accumulator pinions 65' to allow time between the clearing action and the return to normal giving the mechanism returning to zero a chance to overcome any tendency of displacement or from getting out of gear.

The digital control disclosed in the patents hereinbefore mentioned is wholly that of addition and requires the co-digital marking of the keys. In the present invention, however, the co-digital marking of the keys is eliminated. The elimination of co-digital key markings results from the provision of novel means for digitally controlling the actuating mechanism of the machine whereby, when the machine is employed for negative calculation, complements of the respectively indicated key values are automatically added. With such novel means when performing negative calculation the actuating mechanism is controlled to add 8 upon depression of the #1 key, 7 upon depression of the #2 key, 6 upon depression of the #3 key, etc., in all orders to the left of the units order. In the units order during negative calculation depression of the #1 key will add 9, depression of the #2 key will add 8, etc. As in the key set machines which perform examples in the four forms of arithmetic, means is provided for selectively setting the machine for addition, multiplication, subtraction or division. To facilitate the setting of the machine for addition and multiplication a special key marked with the addition sign is provided at the left side of the keyboard. Another special key with the sign of division on it is also provided on the left side of the keyboard rearwardly of the addition key. A special key with the sign of subtraction on it is provided on the right side of the keyboard. Another digital setting key is provided on the left side of the machine and is marked "Sup'r" with the subtraction sign. The last mentioned key sets the machine for subtraction of amounts from the super-totalizer or the number appearing in the secondary register.

Each of the presetting manipulative keys referred to is operatively connected to devices and mechanisms for setting the machine so that the actuating mechanism may be digitally controlled for the desired form of arithmetical calculation. Thus when set for positive operation the machine will be ready for addition and multiplication. When set for negative operation the machine will be ready either for division or subtraction of the totals of the primary register of subtraction from totals of the secondary register depending upon the key depressed.

Besides the means for selectively preparing or setting the machine for the four forms of arithmetic, manipulative means is provided for clearing the negative setting of the machine and resetting it for positive forms of calculation. Such manipulative means is adapted to cooperate with the zeroizing mechanism to clear and reset the machine as the primary register is cleared whenever an amount is subtracted from the secondary register and while a subtraction is being made from the total of the primary register, after division, by the addition key and, after subtraction, automatically.

To that end in the machine of the drawings a supplemental or negative stop bar operating adjacent and beneath the regular or positive stop bar cooperates with and regulates the movement of each denominational order of the actuating mechanism to add complements of the numbers on the respective keys as they are depressed. The arrangement as disclosed in the drawings provides means for operating or setting the positive and negative stop bars in order that the machine may be controlled either positively in addition and multiplication by the positive stop bars or negatively in subtraction and division by the negative stop bars. The special digital setting or presetting manipulative keys hereinabove mentioned are employed to operate the bars for digitally controlling the actuating mechanisms according to whichever stop bars may be connected thereto.

Figures 13, 19:
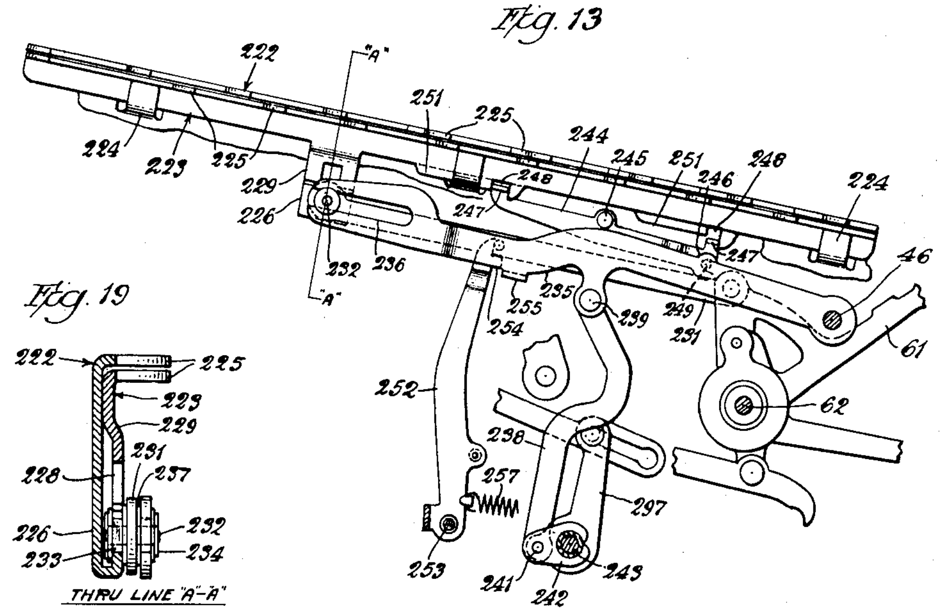
Fig. 13 is a fragmentary detail view of the digital control mechanism and its shifting means.
Figs. 19, 20 and 21 are detail views of the mechanism connecting the digital stop bars and the respective actuating sectors.

As shown in Fig. 13 the positive and negative stop bars in each denominational order are designated by the reference characters 222 and 223, respectively, and are longitudinally reciprocal in offset lugs or keepers 224 on the upper part of the frame plate. The upper stop bar 222 is the positive stop bar. The negative stop bar 223 operates adjacent and beneath the positive stop bar.

Along its upper margin each of the positive and negative stop bars 222 and 223 is provided with a plurality of laterally extending, spaced, stop lugs 225. The positive stop bar 222 in each order has a depending arm 226 which is formed or otherwise provided with an upwardly facing slot 227 in a laterally offset portion at the lower end of the arm 226. In opposed relation to that slot 227 is a downwardly facing slot 228 in a depending arm 229 of each negative stop bar, the arm 229 at its upper end being offset laterally sufficiently to align the slot 228 with the opposed slot 227 (Figs. 19 and 21).

Thus the positive stop bar 222 is like those disclosed in the above mentioned Patent No. 2,063,962 and as in that patent the stop lugs 225 on each stop bar 222 are spaced progressively farther back of the key stems from the front to the rear of the machine, being stepped back a unit graduated step for each progressively higher key. In other words the forward stop lug 225 of each positive stop bar 222 is spaced one step back of the #1 key and the last or rearmost stop lug 225 of each positive stop bar 222 is spaced nine steps back of the #9 key in each denominational order. With the exception of the last or rearmost stop lug 225, the stop lugs 225 of each negative stop bar 223 are spaced progressively farther back of the key stems from the rear to the front of the machine, being stepped back a unit graduated step for each progressively lower key. In other words the rearmost stop lug 225 of each negative stop bar 223 is directly beneath and aligned with the rearmost stop lug of each positive stop bar 222 and the stop lug 225 of each negative stop bar 223 is spaced one step back of the #8 key and the forward stop lug 225 of each negative stop bar is spaced eight steps back of the #1 key.

In said Patent No. 2,063,962 a link formed a permanent connection between the actuating sector and the stop bar of each denominational order. In the present invention a link 231 in each denominational order is permanently connected only with the actuating gear sector 61. The link 231 in each order is pivoted to the gear sector 61 and is provided at the rear end with a stud 232 fixed therein and carrying a square or box collar 233 which fits on the stud 232 and which is held in place by a buckled washer 234. Each buckled washer 234 is riveted on the end of the stud 232 of the same order to hold the box collar 233 on the stud and to provide friction for keeping the box collar from getting out of place in assembly.

Figures 21, 22, 27:
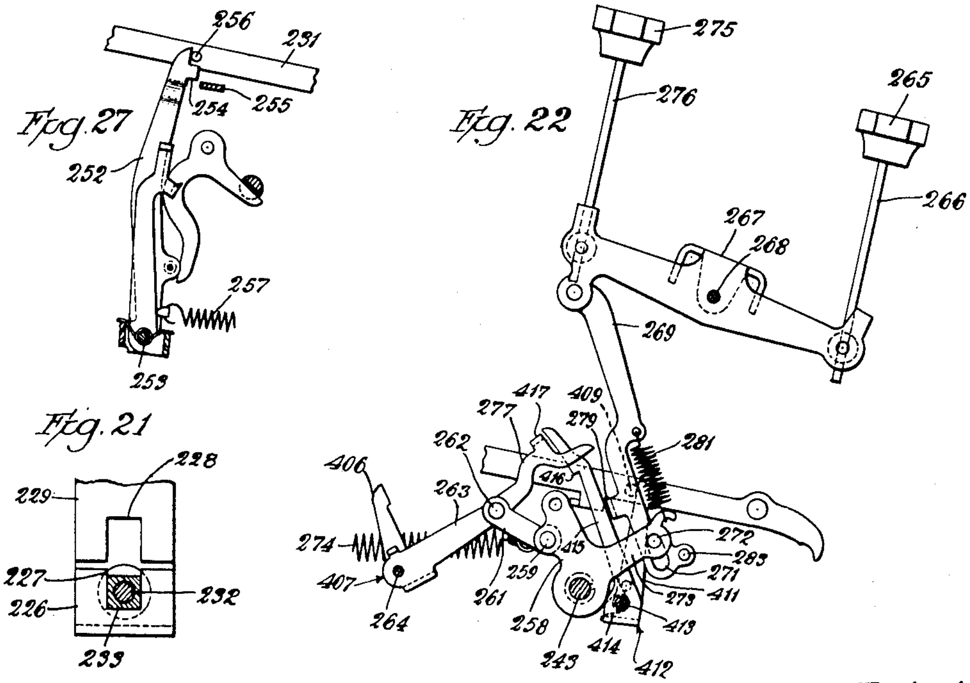
Fig. 22 is a detail view of the means for maintaining the digital control shaft in any of its preset positions respectively predetermining the various forms of calculation.
Fig. 27 is a fragmentary detail view showing the lock for the digital control bar shifting link and the means for clearing it upon zeroizing.

Each box collar 233 as shown in Figs. 19 and 21 is adapted to operate in the opposed slots 227 and 228 of the arms 226 and 229 depending from the stop bars 222 and 223. As illustrated in those two views of the drawing the box collars 233 are engaged in the slots 227 of the arms 226, whereby the sectors 61 and the links 231 may draw the positive stop bars 222 forward for performing addition or multiplication.

With the mechanism in normal position as disclosed in Figs. 3 and 13, the sectors 61 are connectable through their links 231 with their negative stop bars 223 for negative forms of calculation by lifting or raising the links 231. As the links 231 move upwardly the box collars 233 slide into the slots 228 in the arms 229 of the negative stop bars 223. In that manner the sectors 61 are disconnected from the positive stop bars 222 and connected with the negative stop bars 223.

Figure 20:
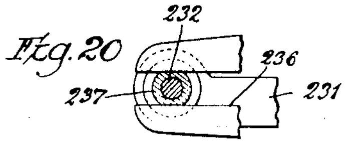

For lifting or raising the links 231 a slotted guide arm 235 (Figs. 3 and 13) is pivoted in each order of the machine on the transordinal shaft 46 which forms the support for the forward lever 44 supporting the front end of the power trip bar 51. The rear end of each arm 235 is provided with an open slot 236 which forms a guide for a double flanged collar 237 flattened on opposite sides as shown in Fig. 20. Each collar 237 is arranged on the stud 232 fixed in the rear end of the link 231 so as to slide back and forth in the slot 236 whenever a power action is applied to the gear sector 61. About midway between their ends the guide arms 235 are pivotally connected to links 238 by means of studs 239 and the links 238 are each pivoted on a transordinal rod 241 supported by and passing through arms 242 fixed on a transordinal rock shaft 243.

Thus when the transordinal rock shaft 243 is rotated clockwise (Fig. 13) the links 238 are raised, the guide arms 235 are swung upwardly and the box washers 232 are moved into the slots 228 in the arms 229 of the negative stop bars 223, conditioning them for operation by or through the links 231. In that manner the negative stop bars 223 become the digital control in all of the denominational orders for their actuating sectors 61. When held in such position the negative stop bars serve to control the actuating sectors 61 negatively according to the digital keys depressed in their respective orders just as the positive stop bars control the actuating sectors according to the keys depressed in their respective orders in addition as described in the aforesaid Patent No. 2,063,962.

To prevent the guide arms 235 from being shifted out of position during an actuating movement when the link 231 is engaged with one or another stop bar, a lock lever 244 is pivoted to the skeleton frame at 245. The lock lever 244 has a jaw 246 at its front end (Fig. 13) and is provided with two bent lugs 247 one of which is at its rear end and the other of which is at its front end. Because the lug at the front end faces the right, an offset is made in the front end of the lever 244 to allow for such arrangement. This lever 244, in the position illustrated in Fig. 13, has its rear lug 247 engaged in a notch 248 formed in the lower edge of the negative stop bar 223. Thus, as shown in Fig. 13, a lock is provided for the stop bar 223, and the link 231 of the actuating sector 61 is engaged with the positive stop bar 222. To hold it in such position, a pin 249 is so fixed in the guide arm 235 as to enter the jaw 246 of the lock lever 244 whereby to hold it in that position.

When, however, the transordinal rock shaft 243 is rotated in a direction to raise the links 238 and, through the guide arms 235, to shift the connection of the links 231 into the slots 228 of the negative stop bars 223, the front lock lug 247 is likewise raised and passes into a similar notch 248 in the positive stop bar 222. That releases the rear lug 247 from the notch 248 in the negative stop bar 223. Thus each positive stop bar will be locked and the corresponding negative stop bar will be unlocked as the lug 247 is thrown down and out of engagement with the notch 248 of the negative stop bar 223.

When the connection for the positive stop bar 222, as shown in Fig. 13, is made and a power action takes place, a downwardly projecting portion 251 of the positive stop bar passes over the top of the front lug 247. While the positive stop bar 222 is so displaced in a power action, the projecting portion 251 will block any movement of the guide arm 235. In other words, so long as the positive stop bar 222 is out of its normal position no shifting operation can be given to the guide arm 235. Similarly, there is provided a downwardly projecting portion 251 of the negative stop bar 223. When the guide arm 235 is lifted to engage the link 231 with the negative stop bar, the bent lug 247 on the rear end is down and the projecting portion 251 of the negative stop bar passes over that lug 247 whereby to prevent disconnecting the link 231 from the negative stop bar 223 during the power action.

Co-acting with the stop bar locking mechanism just described for holding the guide arms 235 in engagement with either the negative or positive stop bars, a plurality of dogs or lock levers 252 are pivotally mounted on a transordinal rod 253. Each lock lever 252 is provided with a latch lug 254 at its upper end which is adapted to engage a bent lug 255 of the corresponding guide arm 235. Normally a pin 256 fixed in each link 231 holds the latch lug 254 out of engagement with the bent lug 255 of the guide arm 235 (Figs. 3, 13 and 27) against the action of a spring 257. The spring 257 is adapted to draw the latch lug 254 into engagement with the bent lug 255 as the link 231 is drawn forward by its actuating sector 61 in an actuating movement. It will be noted that the latch lug 254 is so arranged that it swings over the top of the bent lug 255, when the machine is set for positive calculation, and swings under the bent lug, when the machine is set for negative calculation. Such construction provides an extra lock against accidental shifting of the guide arm 235 during a power action in both positive and negative calculation.

Figures 30, 32:
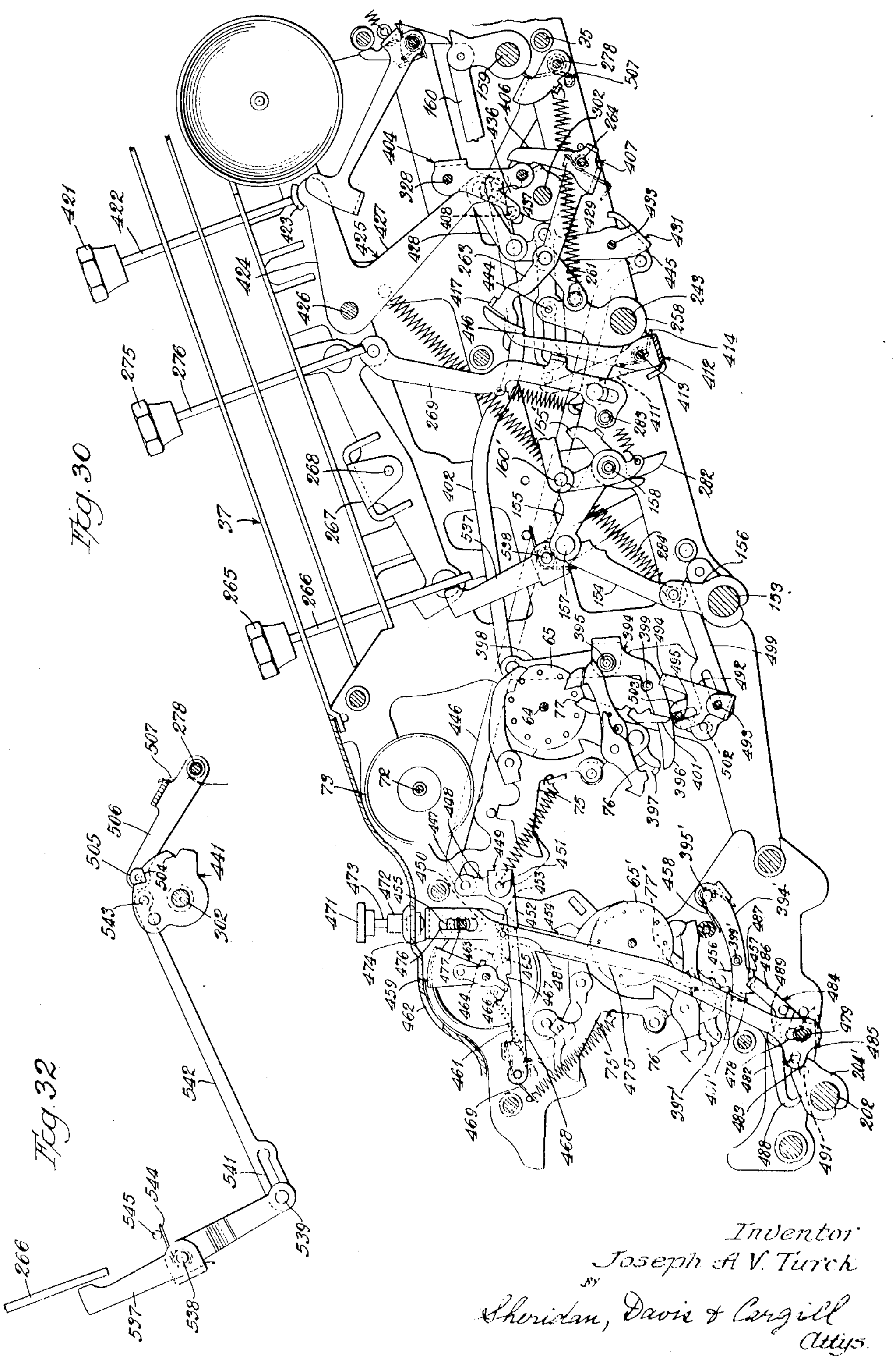
Fig. 30 is a fragmentary longitudinal section taken through the calculating machine of Fig. 1 on a plane adjacent the overflow column and shows certain details of the division and super-totalizer control means.
Fig. 32 is a fragmentary detail view showing means for locking the "add" key when the subtraction control key has been depressed and machine is conditioned for subtraction.

As already disclosed the machine is set for either negative or positive calculation by the rocking of the transordinal rock shaft 243. Referring now to Figs. 22 and 30, it will be observed that the left end of the rock shaft 243 has an arm 258 keyed therein. Pivotally carried by the arm 258 on a stud 259 is a toggle link 261 which in turn is pivoted as at 262 to a toggle lever arm 263. The toggle lever arm 263 is pivoted to a transordinal rod 264 mounted in the frame of the machine and forms with the link 261 a digital control toggle. To set the machine for positive calculation (Figs. 22 and 30), the positive key hereinbefore referred to as being marked with the sign of addition but now designated for convenience by the reference character 265 is depressed. That key 265 is provided with a stem 266 which is notched to receive a stud fixed in the front end of a walking beam lever 267 mounted on a short shaft 268. Connected to the opposite end of the lever 267 by a pivot stud is a link 269 having at its lower end a slot 271 operating on a stud 272 of an arm 273 integral with the arm 258.

With such an arrangement if the machine has previously been set for division and something is to be added to the answer or quotient it is necessary to reset the machine for positive calculation. To do so the key 265 is depressed to lift the stud 272 in the arm 273 from the lower end of the slot 271 in the link 269, as explained in detail hereinafter, and to bring the rock shaft 243 into the disclosed position where it is held by a spring 274. If, however, the machine is set for addition and the division key, previously referred to as having a mark of division thereon, but now for convenience designated by the reference character 275, is depressed, its stem 276, having a notch in it like that in the stem 266 of the key 265 for connecting the division key to the opposite end of the walking beam lever 267, will cause the link 269 to be depressed. When the link 269 is so depressed, the upper end of the slot 271 operating against the stud 272 rotates the arm 273 in a clockwise direction as disclosed in Fig. 22. Such rotation will cause the toggle 261, 263 to move toward its makeup position or, in other words, to be straightened out so that a loop 277 in the free end of the toggle link 263 will be drawn down where it will contact with the pivot stud 259 of the toggle link 261.

When the division key 275 is depressed, the pivot 262 will drop below the center line between the pivots 264 and 259 of the toggle 261, 263. When that occurs a toggle lock is produced to prevent the transordinal rock shaft 243 from returning, and to make this toggle action more secure, the spring 274, attached to the stud 259 by a spring or resilient link and to a cross-rod 278 (Fig. 30) at the rear of the machine, serves to prevent the toggle from rebounding above the center when so made up. Thus when the division key is depressed the digital control is set for that form of negative calculation only.

The clockwise rotation (Figs. 13 and 22) of the shaft 243 caused by depression of the division key 275, besides resulting in the making up of the toggle 261, 263, also, as already described, will result in the raising of the guide arms 235 and the shifting of the link connections 231 of the gear sectors 61 into engagement with the set of negative stop bars 223. When, after so setting the toggle, it is desired to use the machine for addition or multiplication, the positive key 265 is depressed to raise the link 269. The link 269 is provided with a bent lip or projection 279 which rises with the link sufficiently to engage the free end of the toggle lever arm 263 and to swing that toggle lever arm upwardly until the center pivot 262 of the toggle rises above its toggle center. The tension of the spring 274 will thereupon break the toggle to its limit and the transordinal shaft 243 will rotate counter-clockwise (Figs. 13 and 22) to reset all of the guide levers 235 and the links 231 of the gear sectors 61 for cooperation with the positive stop bars 222.

During such depression of the positive key 265, the slot 271 permits a limited amount of upward movement of the link 269 before the toggle 261, 263 is broken which occurs when the lower end of the slot 271 picks up the stud 272. A spring 281 is provided for normally holding the stud 272 at the upper end of the slot 271 and for pulling the stud 272 back into that position after the toggle breaks. From the foregoing it will be understood that, besides breaking the toggle, the spring 274 also performs the work of resetting the machine for positive calculation. Divisive setting on the other hand is performed wholly by the force of the finger action in depressing the division key 275.

As already mentioned, the clearing operation of the primary register is the same as that disclosed in the above mentioned patents. In clearing or zeroizing the machine, the rock frame actuating shaft 153 is rotated counter-clockwise (Fig. 30) to move the forward toggle link 154 of the rock frame detaining toggle in a toggle making direction sufficiently to set the toggle 154, 155. When that toggle is set or made up it holds the shaft 153 and the primary rock frame in the cleared or zeroized position. The toggle lever arm 155 is provided with an integral depending arm 282 so disposed laterally of the arm 155 that during the counter-clockwise rotation thereof in a clearing action, the arm 282 engages a pin 283 located in the lower end of the link 269 and lifts that link to break the digital control toggle 261, 263 thus resetting the digital control for positive calculation.

When the detaining toggle 154, 155 is operated toward set position by the counter-clockwise motion of the rock frame actuating shaft 153 in a zeroizing operation, the arm 156 fixed to the left end thereof pulls the detaining toggle link 154 and the lever arm 155 with it against the action of a spring 284 until the pivot stud 157 between them comes to a straight line between the supporting end pivots of the toggle. When the toggle 154, 155 is so straightened the pivot stud 157 will drop below the line between the supporting pivots by reason of the play or tolerance provided in the pivot holes. Thus the detaining toggle is set and holds the shaft 153 in the cleared or zeroized position and the spring 284 tends to hold the center of the rock frame detaining toggle in the depressed position.

During such zeroizing the arm 282, in moving rearwardly, contacts the pin 283, thereby lifting the link 269 with it. That causes the walking beam lever 267 to tilt clockwise raising the division key 275 and depressing the positive key 265 and, through the lug 279, breaks the digital control toggle 261, 263. Breaking that toggle 261, 263 causes the shaft 243 to turn counter-clockwise (Fig. 22), as already described, which connects the positive stop bars 222 with their respective gear sectors 61, thus resetting the machine for positive actuation by the zeroizing lever.

Figure 11:
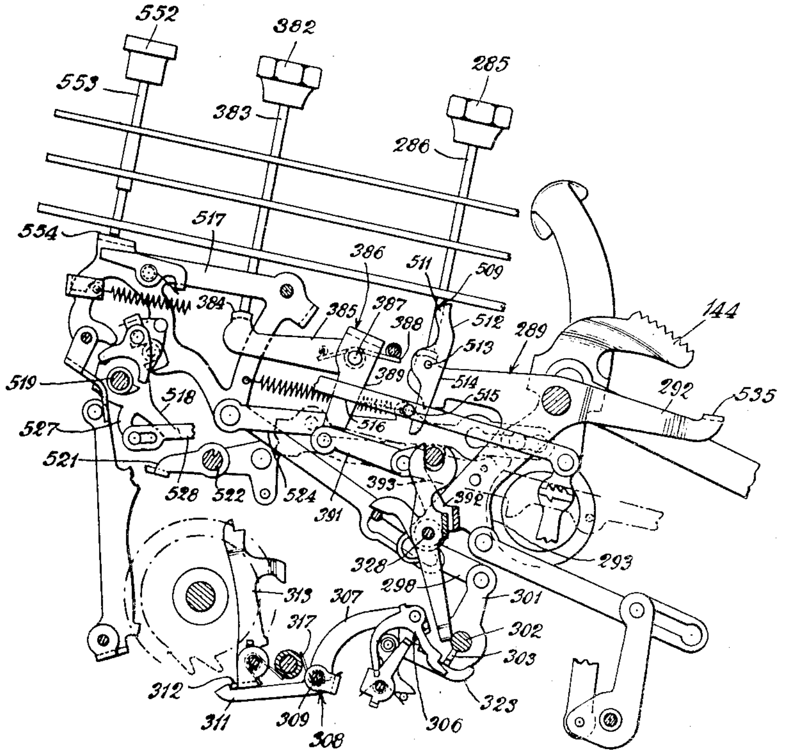
Figs. 11 and 12 are fragmentary elevational views of a portion of the machine taken from opposite sides to bring out certain construction and assembly details of the subtraction control mechanism.
Figure 12:
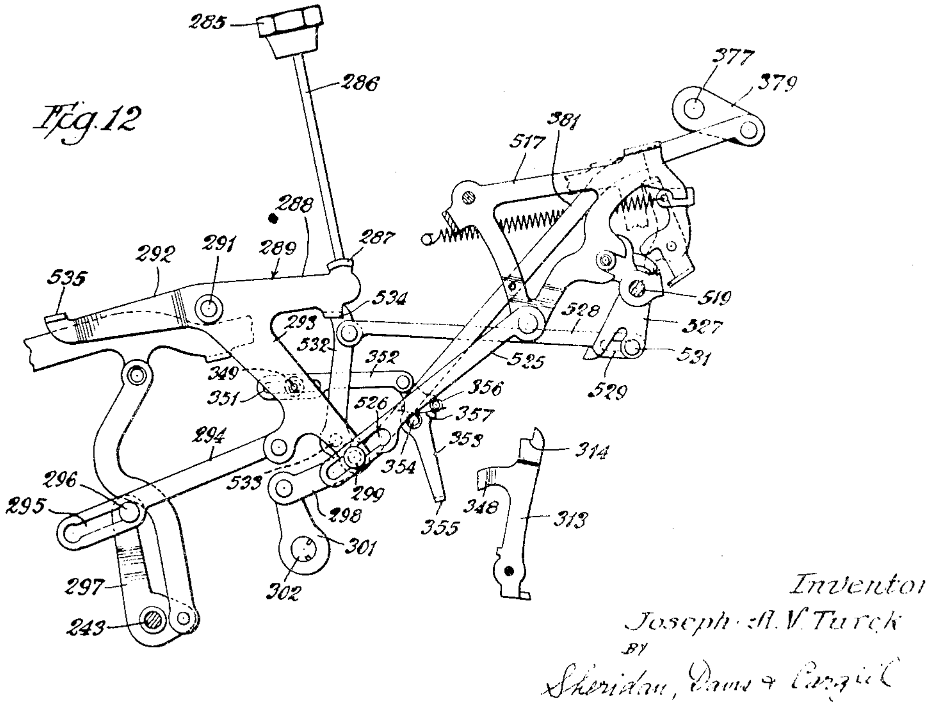

To set the machine for automatic subtraction responsive to the uni-marked digital keys 36, the key marked with the subtraction sign designated for convenience by the reference character 285 is provided with a stem 286 (Figs. 1, 10, 11 and 12). Referring now to Fig. 12 it will be noted that the stem 286 extends through the key plates and contacts a bent lip 287 on a rearwardly extending arm 288 of a three-armed or subtraction lever 289. The three-armed lever is pivoted as at 291 to the rightmost partition plate 34 and in addition to the arm 288 is provided with a forwardly extending arm 292 and a downwardly extending arm 293. The downwardly extending arm 293 is pivotally connected to a slotted link 294 having a slot 295 therein which operates on a stud 296 in the upper end of an arm 297 fixed on the transordinal rock shaft 243. With such construction the shaft 243 is rotated counter-clockwise (as viewed in Fig. 12) and clockwise (as seen in Fig. 13) when the key 285 is depressed. The arm 297 thus serves as means for operating the transordinal rock shaft 243 to set the machine for subtraction.

To the lower end of the lever arm 293, a link 298 is connected by a stud 299 fixed therein. At its other end the link 298 is pivotally connected by a stud with an arm 301 which is keyed or fixed to the right end of a rockable transordinal shaft 302. The normal position of the lever is shown in Fig. 12. When the subtraction key 285 is depressed to set the digital control for subtraction, the three-armed lever 289 is rotated in a clockwise direction and so rotating the lever 289 through the link 298 rotates the shaft 302 in a counterclockwise direction. The shaft 302 is, as already stated, a transordinal shaft passing through the framework of the machine and serves to transmit action to the interordinal mechanism. Anchored in, and projecting radially outwardly from the shaft 302 is a series of lugs 303 (Fig. 11), one for each denominational order of the machine which are separated by the frame plates supporting the shaft.

Figure 14:
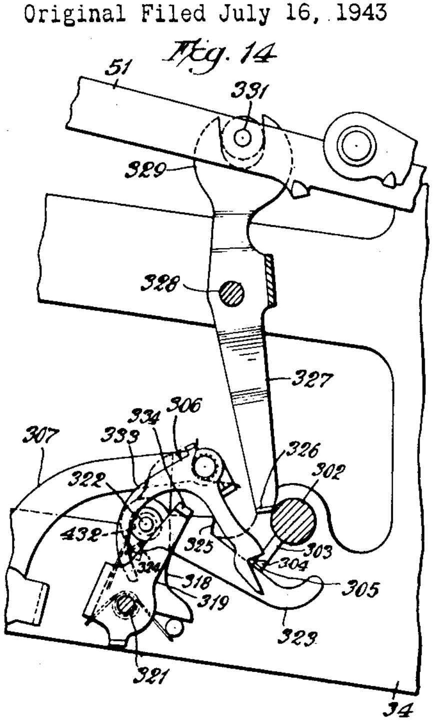
Figs. 14, 15 and 16 are enlarged detail views of a portion of the machine and show the automatic actuation control mechanism in various stages of operation.
Figure 16:
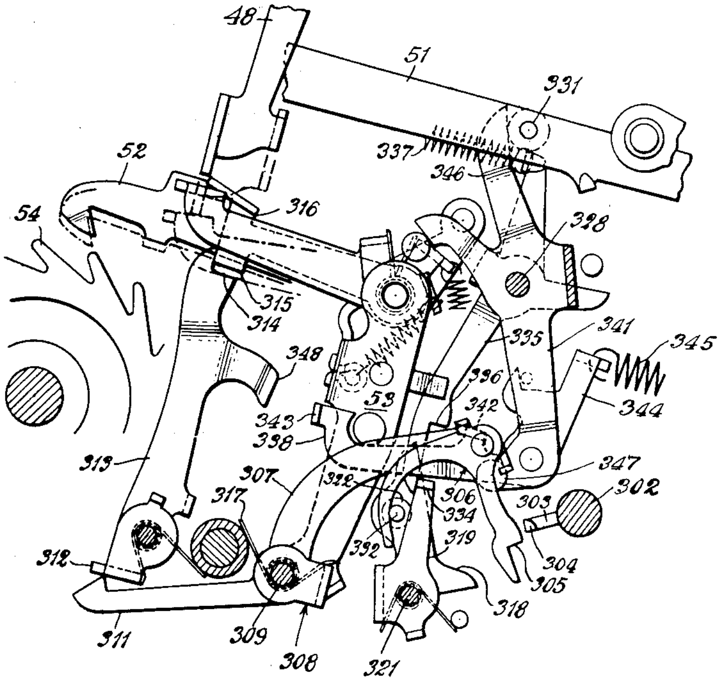
Figure 17:
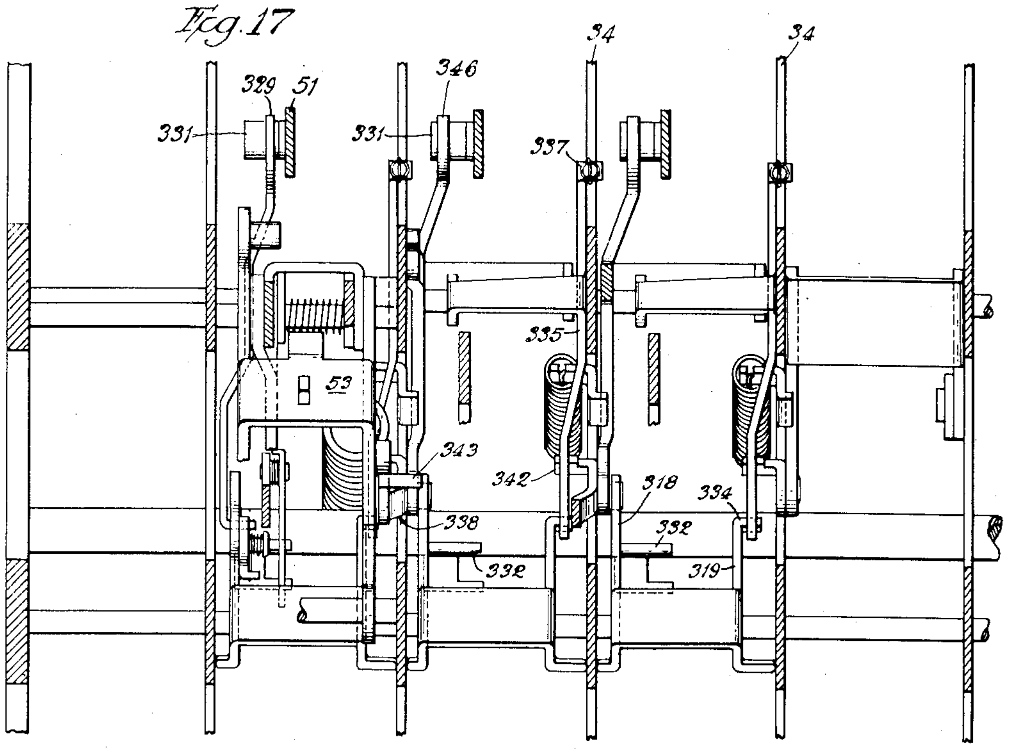
Figs. 17 and 18 are enlarged transverse sectional views taken at the rear of the machine to show certain details of the automatic actuation control mechanism, parts being omitted for the sake of clarity.
Figure 18:
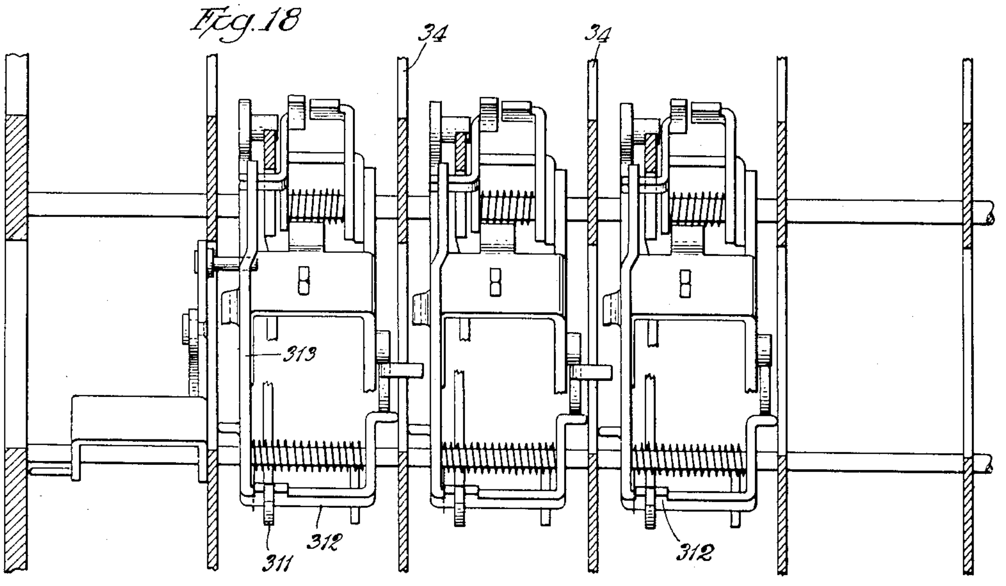

Each lug 303, as shown in Fig. 14, is provided with a laterally extending portion or quarter-round projection 304. As the shaft 302 is rotated clockwise (Fig. 14) each projection 304 rotating therewith engages a latch surface 305 of a dog 306, pivoted to an arm 307 of a latch lever 308, and raises the arm 307 of the latch lever 308. The latch levers 308 are mounted on a transverse shaft 309 and each includes a rearwardly extending latch arm 311 (Figs. 11 and 16). Each latch arm 311 moves downwardly as the arm 307 is raised to disengage a latch lug 312 at the lower end of a suitably pivoted spring pressed retaining dog 313. In each denominational order a similar unlatching action releases all of the retaining dogs 313 allowing them to swing forwardly as disclosed in Fig. 16. In swinging forwardly an upper end 314 of each retaining dog 313 passes under a bent lip 315 of a detaining dog 316. Such action of the dogs 313 serves to prevent the clutch hooks 52 in all of the orders from being depressed by key action until the retaining dogs 313 have been again thrown out of engagement with the bent lips 315 and relatched by the latch levers 308. The cooperation of the dogs 313 and 316 allows the digital keys in all except the units order to be set without a power action, thus in automatic subtraction delaying the action until the last key is depressed in the units order.

Before the latch levers 308 return to normal latching position ready to relatch the latch lugs 312 of the retaining dogs 313, they are released by disengaging the quarter-round projections 304 from the dogs 306 which hold the latch levers 308 in their unlatched positions against the action of springs 317. As disclosing means for so releasing the latch levers 308, reference is made to Figs. 11 and 14 which, while specifically relating to the mechanism in the first or units order, are, at least in part, illustrative of the mechanism in the other orders. As therein illustrated a double-armed lever with spaced right and left arms 318 and 319 is mounted on a cross-rod 321 supported by the framework of the machine. Pivotally mounted on the right lever arm 318 by a pivot stud 322 is a dog 323 which is urged upwardly by a spring 324 passing around the hub of the pivot stud 322 and engaging a bent lip of the dog 323. As disclosed in Fig. 14 normally the projection 304 of the lug 303 holds the dog 323 down against its spring action so that its latch point 325 is normally below the path of a lateral end portion 326 of a lever 327 pivoted on a cross-rod 328.

The lever 327 is provided in its upper end with a jaw 329 embracing a pin 331 in the power trip bar 51 in the first or units order. As already explained the power trip bar 51 of the units as well as the other denominational orders swings forwardly upon depression of any digital key in its order. Such forward movement of the bar 51 from its position disclosed in Fig. 14 causes the lower end portion 326 of the lever 327 to be swung rearwardly about its pivot 328. As disclosed in Fig. 14 the end portion 326 will normally pass over the latch point 325 of the dog 323 without disturbing it.

If, however, prior to such movement of the lever 327, the shaft 302 is rotated during the setting of the machine for subtraction, the lug 303 rotating with the shaft 302 is moved rearwardly and upwardly to the position disclosed in Fig. 16. Such movement of the lug 303 will allow the spring 324 to raise the dog 323 and the latch point 325 moving the latter into the path of the end portion 326 of the lever 327. Thereafter any key action in that order causes the end portion 326 of the lever 327 to engage the latch point 325, swinging it and the double-armed lever 318, 319 rearwardly, and causes a pin projection 332 of the pivot stud 322 to engage a curved arm 333 of the dog 306 and to rotate the dog 306 on its pivot sufficiently and in a direction to disengage its latch surface 305 from the quarter-round projection 304 of the lug 303. Thus the latch lever is freed and its spring 317 moves the latch arm 311 of the latch lever 307 upwardly into latching engagement with the latch lug 312, and the dog 306 is moved as disclosed in Fig. 16 out of the path of the quarter-round projection 304 of the lug 303.

The dog 323 has an upwardly curved forward or free end which, when allowed to rise as just described, engages the forward under surface of the transordinal shaft 302. As the dog 323 is moved rearwardly by the action of the lever 327, the curved end of the dog 323 cooperates with the shaft 302 engaged thereby to cam the dog downwardly sufficiently for its latch point 325 to disengage the end portion 326 of the lever 327, allowing that lever to continue its clockwise movement (Fig. 14) without holding up the relatching of the latch lever 308.

Figure 15:
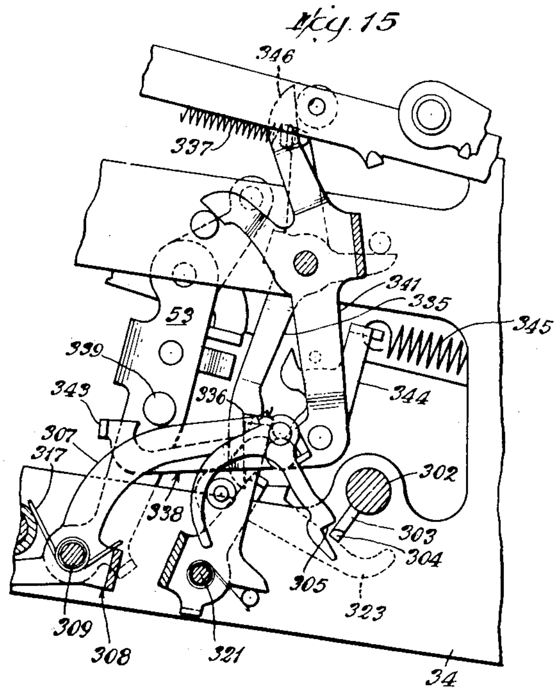

The arm 319 of the double-armed lever 318, 319 in the units order is provided at its upper end with a projection 334. That projection is adapted to engage the lower arm of a spring pressed latch 335 when the lever 318, 319 is rotated counter-clockwise (Figs. 14 and 15) by the dog 323. The latch 335 is pivoted on the cross-rod 328 in the units order and has a latch tooth or shoulder 336 and is urged in a counter-clockwise direction about its pivot by a spring 337. The latch 335, as disclosed in Fig. 15, serves to hold a spring operated hooked dog 338 out of engaging relationship with a pin 339 located on the left side of the units order guide arm 53 of the machine. The hooked dog 338 is pivoted to the lower extremity of a lever 341 which is pivoted to the next higher or tens order of the machine on the cross-rod 328. That hooked dog is formed or otherwise provided with a latch lug 342 engageable by the latch tooth 336, a bent lug 343 at its rear end, and an upstanding arm 344 at its forward end, and a spring 345 normally urges the hooked dog toward engaging relationship with the pin 339.

When the arm 319 of the double-armed lever 318, 319 is rotated rearwardly in a counter-clockwise direction, as already described, by the dog 323 under key action of the mechanism in the units order, the latch tooth 336 is released from the latch lug 342 of the hooked dog 338, allowing that dog to rise under the action of its spring 345 and to hook over the pin 339 in the actuating link guide arm 53. From the unlatched or normal position of the hooked dog 338 (Fig. 15) the dog is raised into latching relationship with the pin 339 of the guide arm 53 (Fig. 16), to connect the lever 341 with a lower order power action. The lever 341 is provided with an upwardly extending arm 346 which is normally in engagement with the stud 331 of the bar 51 in the next higher order.

The operation of the lever 341 and its hooked dog 338 by the release of the latch tooth 336 upon counter-clockwise rotation of the double-armed lever 318, 319 is identical with that occurring seriatim in every order across the machine when a power trip action is initiated in the lower or units order as already described. While the action of the double-armed lever 318, 319 in the first order is set in motion by key depression and the consequent action of the dog 323, the power action taking place in the first order is transmitted through the hooked dog 338 and rotates the lever 341 of the tens order on its pivot shaft 328. Such rotation of the lever 341 rotates its arms 346 which thrusts the pin 331 of the power trip bar 51 and the bar itself forwardly and in that manner automatically causes a power action in the tens order.

Fixed in the lower end of the lever 341 of the tens order is a stud 347 projecting therefrom to the left. The upper end of the arm 318 of the double-armed lever 318, 319, as best disclosed in Fig. 16, is in the path of the stud 347 which, as it swings rearwardly with its lever 341, contacts the upper end of the arm 318 of the double-armed lever in the tens order and swings that double-armed lever rearwardly with it. Such rearward swinging of the double-armed lever 318, 319 in the tens order will unlatch the hooked dog 338 in the next higher or hundreds order and start a power action of the lever 341 in that order which in turn will through its stud 347 set off the power action in the next higher order. Such an initiation of power action progresses from each lower order to the next higher order from right to left across the machine consecutively or seriatim.

From the foregoing description it will be understood that after depression of the subtraction key 285, depression of a digital key 36 in the units order initiates a power action in that order and such power action will, through the mechanism preset by the subtraction key, cause automatic power operation of all orders to the left.

At the rear ends of the hooked dogs 338, the bent lugs 343 are adapted to co-act with forwardly projecting arms 348 of the retaining dogs 313. Thus as the hooked dogs 338 are drawn rearwardly by the pins 339 of the actuating guide arms 53 under a power action, the retaining dogs 313 are thrust rearwardly by the contact of the bent lugs 343 with the arms 348. That rearward movement of the retaining dogs 313 releases the upper ends 314 of those dogs from the lugs 315 of the detaining dogs 316. As a result any of the clutch hooks 52 held out of engagement with their clutch wheels 54 by the retaining dogs 313 will be released and allowed to engage their respective clutch wheels as the automatic power action takes place in the next lower order. Thus the clutch hooks are cleared and the power action progresses from right to left across the machine when the digital key in the units order is depressed. As the retaining dogs 313 clear the lugs 315 of the detaining dogs 316, they will drop in front of the latching upper ends 314 of the dogs 313. When the clutch hooks 52 are thereafter moved rearwardly, the lugs 315 will carry with them the retaining dogs 313, thus moving the latch lugs 312 to such position that the latch arms 311 will latchingly engage their latch lugs 312 and will hold the retaining dogs 313 out of further retaining action with the clutch hooks 52 until the subtraction key 285 is again depressed.

It will be understood that the arms 318 of the double-armed levers carrying the pins 332 will, as disclosed in the lower order, likewise perform in the higher orders the function of unlatching the dogs 306 from the projections 304 of the lugs 303 on the rock shaft 302. The resulting automatic power action initiated in the lower or units order continuing seriatim across the machine will release all the dogs 306 from their lugs 304. Likewise all the latch levers 335 will be swung forwardly seriatim by the projections 334 of the double-armed levers 318, 319, thus clearing the normal latched down condition of the hooked dogs 338.

As already mentioned, the action of one order affects the next higher order of the described automatic mechanism and initiates action therein and, as each power trip bar 51 swings forwardly, it causes a power action to take place in that order. In some orders, however, the digital keys 36 representing the subtrahend will have already set the power trip bars 51. Only such orders that have no key set therein are therefore affected by the automatic mechanism. A power action is, however, effected in all orders except the units order which, as already explained, is key responsive.

Thus the actuation of any gear sector 61 in an adding movement will be effected according to whatever key 36 has been depressed in that order, and in orders where no key 36 has been depressed each gear sector 61 will operate its full throw to add nine in that order. It will be remembered that the operations just described pre-suppose the depression of the automatic subtraction key 285 first to set the machine for negative calculation. When that is done, for whatever keys 36 subsequently depressed in the various orders in setting up the subtrahend, a complement of the amount represented by each key will be automatically added into the primary register when the units order is finally operated.

The retaining dog 313 in the units order is cleared by means different from that already described for clearing the dogs 313 in the orders to the left of the units order. Its function in the units order is also somewhat different in that in the units order it serves to prevent a power action from taking place as a result of the depression of a key. It normally prevents the clutch hook 52 from engaging its clutch wheels 54 until the subtraction key 285 is completely set, thus assuring that the machine will be fully preset for subtraction before it is possible to initiate the seriatim power actions. In other words when the subtraction key 285 is fully depressed, the machine becomes a key-set machine in all orders except the units order which will be key-responsive. If, on the other hand, the subtraction key is depressed only say seven-sixteenths of its downward movement instead of its full distance, the retaining dog 313 in that order will not be cleared of the units order detaining dog 316 and if operated will not start a subtraction movement until the subtraction key is fully depressed.

To assure such operation the downwardly extending arm 293 of the three-armed lever 289 is, as shown in Fig. 12, provided with a pin 349 projecting leftward through a slot 351 in a rock bar or link 352 attached to the upper arm of a lever 353 pivoted to the framework of the machine by a stud 354. That lever 353 at its lower end is provided with a bent lip 355 turned leftward toward the center of the machine and projecting through an opening in the frame. The bent lip 355 is adapted, when the lever 353 is swung counter-lockwise (Fig. 12), to engage the arm 348 of the retaining dog 313 while that dog is unlatched for subtraction. The arrangement of the link 352 and the lever 353 is such that, when in their normal positions as disclosed in Fig. 12, the lever 353 is held against a retaining pin 356 by means of a spring 357. That spring is arranged about the hub of the lever 353. One end of the spring 357 is held by a lug on the lever 353 and the other end of the spring presses upwardly against the retaining pin 356. When the lever 289 is operated by the subtraction key 285, the pin 349 is wung downwardly and forwardly. As the pin 349 reaches the end of the slot 351, the pin swings the link 352 to the left to rotate the lever 353 counter-clockwise (Fig. 12). Such rotation of the lever 353 swings the lower bent lip 355 rearwardly into engagement with the arm 348 of the retaining dog 313, thus operating the dog 313 to disengage its latch end 314 from the bent lug 315 of the clutch hook detaining dog 316. The clutch hook 52 in the units order is in that manner cleared for a power action. The pin 349 and the slot 351 are so arranged as to time the release of the units order retaining dog 313 to coincide with the end of the setting movement of the subtraction key 285. Thus the units order keys cannot cause a power action unless and until the subtraction key 285 is fully depressed.

During a power action in each denominational order in a subtraction operation, initiated in the manner hereinbefore described, the hooked dog 338 in that order will be carried rearwardly from its position of Fig. 16 (to the left therein) by its guide arm 53 to rotate the lever 341 in a clockwise direction about the shaft 328 to move the power trip bar 51 in the next higher order forwardly (to the right in Fig. 16). In such rearward or leftward movement of the hooked dog 338, its latch lug 342 will move the associated latch 335 clockwise against its spring 337 sufficiently to cause re-engagement of the lug 342 under the latch tooth 336 of the latch 335. Rearward movement of the hooked dog 338 will be terminated by the automatic disengagement of the clutch hook 52 from its toothed wheel 54 in the manner previously described, whereupon the guide arm 53 will be returned forwardly (to the right in Fig. 16) by the spring 57 (Fig. 3). The resulting denominational actuation includes rearward movement or return to the normal position shown in Figs. 15 and 16 of the power trip bar 51. Such return movement of the power trip bar 51 will, through its pin 331, rotate the lever 341 associated therewith in a counter-clockwise direction (viewing Fig. 16) back to its normal position of Figs. 15 and 16. During such return movement of each lever 341, the springs 337 and 345 will maintain the latching engagement between the lug 342 and the latch tooth 336, whereby the hooked dog 338 will be rotated back to its normal position of Fig. 15. This automatic return movement of each lever 341, hooked dog 338 and associated latch lever 335 will not be interfered with by the double-armed lever 318, 319 associated with the lever 335, since such double-armed lever 318, 319 is in the next lower denominational order from that of the lever 335 and will have been returned automatically to the normal position of Figs. 14 and 15 by clockwise rotation imparted thereto by its individual spring.

In subtraction by the complemental method as hitherto practiced, every nine appearing in the subtrahend is ignored. Herein, however, it is important in order to carry out the continuity of action in all orders, to produce action in each order wherein a nine appears in the subtrahend without effecting movement of the gear sector 61 in that order. For that purpose novel means is provided to allow the operator to set the #9 key of every order wherein a nine appears in the subtrahend and to block any action occurring therefrom.

As already described the automatic seriatim initiation of power actions in succeeding orders to the left of the units order by the action of a lower order will cause every clutch hook 52 in each of the higher orders to engage its clutch wheel 54 when the retaining dog 313 in that order is removed from engagement under the bent lug 315 of its detaining dog 316. If a digital key 36 is set in any except the units order, the nine's complement of the figure on that key 36 is added in that order of the subtrahend. If that figure on the key 36 is a nine, its nine's complement obviously is nothing or zero. Where no key is depressed, as is the case if a cipher should occur in any but the units order, there is nothing to stop or control the movement of the gear sector 61 in such order or orders. Hence, each sector 61 in such case will move the full throw which is the equivalent of adding nine.

Likewise, in division nine is added in every order, except the units order, where a cipher appears in the divisor, so that the #9 key stop lug 225 on each negative stop bar 223 like that of each positive stop bar 222 is so positioned as to add nine. Thus to keep up the continuity of action seriatim across the machine in subtraction, action of the power trip bars 51 and the clutch hooks 52 is allowed to take place without performing any accumulative actuation. That is accomplished, as disclosed in United States Letters Patent No. 2,063,962 by the compensating devices 59 each of which allows movement of the clutch hook 52, guide arm 53, and link 58 when the respective sectors are held against movement.

Figs. 23, 24, 25, 26 and 28 illustrate means for blocking action of the gear sector 61 when the #9 key of the same order is set during a subtractive operation. Normally depression of the #9 key adds nine, but if the negative stop bars 223 are blocked against action by depression of the corresponding #9 keys, the compensating devices 59 will still allow a full movement of the clutch hooks 52, guide arms 53, and actuating links 58, if the clutch hooks 52 were engaged with the clutch wheels 54 without any action of the respective gear sectors 61.

Mounted at the rear end between the lower and intermediate keyboard plates 39 and 41, with upper and lower lugs 358 operating in slots therein, are spring pressed levers 359, one for each denominational order except the units order. Upper and lower arcuate surfaces 361 of each lever 359 pivotally and slidably engage the two keyboard plates 39 and 41 and cooperate with the lugs 358 in the key plate slots to provide a back and forth slidable pivot at the forward end of each lever 359. A spring 362 is passed around a stud 363 centralized with respect to the pivot center of each lever 359 and at its rear end is hooked under a bent lug 364 of lever 359 and at its other end projects downwardly into holes in the lower keyboard plate 39. Each spring 362 yieldably holds its lever 359 in the elevated rearward position illustrated in Fig. 24 and when the lever is removed from such position resiliently urges it toward that position. The action of each spring 362 is such as yieldably to keep its lever 359 in the normal rearward position disclosed in Fig. 24 with the upper lug 358 of each lever against the rear end of its slot and with a slot 365 in an angular or bridge portion 366 of each lever in alignment with the stem of the #9 key, the key stem passing through the slot 365 as best shown in Figs. 24 and 28.

In the rear end of each lever 359, a downwardly folded portion 367 is formed at right angles to and at the left of the angular or bridge portion 366 of the lever. This portion 367 of each lever 359 has an upward extension 368 passing up and through a slot 369 in the intermediate key plate 41 and a lower portion 371 extending downwardly into a slot 372 in the lower plate 39.

The stem of the #9 key in every order except the units order is provided with a notch 373 (Figs. 23, 24 and 25) at such a position that the angular portion 366 of the same order passes through the notch 373 in the key stem. The notches 373 are of such length that when any lever 359 is in the forward position disclosed in Fig. 25 the upper end of the notch 373 upon depression of the #9 key moves an appreciable distance before contacting the angular portion 366 of the corresponding lever 359, thus allowing for the difference in distance moved by the #9 keys and that required for the depression of the levers 359.

Figures 23, 24, 25, 26, 28:
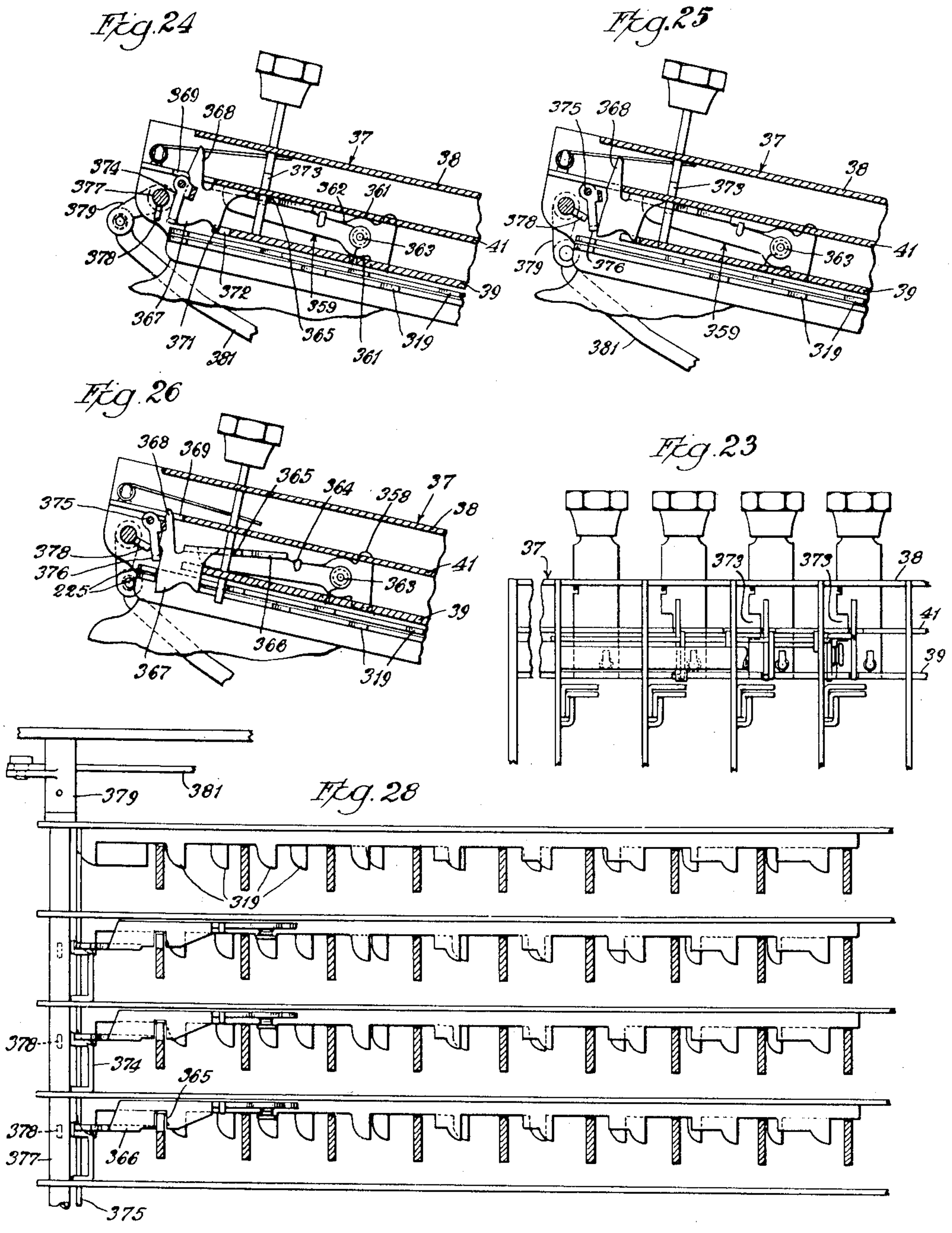
Fig. 23 is a fragmentary detail view taken at the rear of the machine and shows, with certain parts omitted for the sake of clarity, in elevation the actuation control means for the #9 keys.
Figs. 24, 25 and 26 are cross-sectional views taken at the rear of the machine and show in side elevation the actuation control means for the #9 keys in various stages of operation.
Fig. 28 is a top plan view of a portion of the calculating machine, with the keyboard and other parts omitted for clarity, to show the arrangement of the digital control stop bars.

The levers 359 are, as already mentioned, slidable forwardly from the position shown in Fig. 24 to that shown in Fig. 25 against the action of their springs 362. For that purpose the machine is equipped with a series of levers 374, each folded to produce a double hub pivoted on a shaft 375 suitably journaled in the frame plates. Each lever 374 is provided at its free or lower end with a bent lug 376 which extends laterally across the rear edge of the portion 367 of one of the levers 359. To the rear of these levers 374, one of which is provided in each denominational order, a transordinal shaft 377 extends from one side of the machine to the other, passing through and journaled in the frame plates of the machine. For each of the levers 374, a lug 378 is so positioned that, when the shaft 377 is rotated counter-clockwise (Figs. 24, 25 and 26), each lever 374 will be contacted by one of the lugs 378 and swung forwardly on the shaft 375. In so swinging forwardly the bent lugs 376 of the levers 374 will contact the rearward edges of the respective lever portions 367 and will slide the respective levers 359 forwardly and into cooperating position with the #9 keys.

Located at the right side of the machine and fast to the shaft 377 is a lever arm 379 to the free end of which is pivoted a link 381 (Figs. 10, 12, 24, 25, 26 and 28). The link 381, as disclosed in Figs. 10 and 12, is pivotally connected with the stud 299 of the three-armed lever 289 which is actuated by the subtraction key 285. When the subtraction key 285 is operated to preset the machine for subtraction, the resulting rotary movement of the three-armed lever 289 is transmitted through the link 381 and the lever arm 379 to the shaft 377 rotating it counter-clockwise (Fig. 24) to cause the lugs 378 to operate the levers 374. So operated, the levers 374 slide the levers 359 forwardly for cooperation with the #9 keys. Thus the machine is set against any adding actuation which otherwise would result upon depression of one or more #9 keys, each representing or forming a part of a figure of the subtrahend. With a lever 359 in the forward position shown in Fig. 25, as a #9 key approaches its fully depressed position, the upper end of the notch 373 in the key stem engages the angular portion 366 of the lever 359 in that denominational order of the machine. During the remainder of the downward movement of that key #9, it depresses the lever 359 to the position shown in Fig. 26. When the lever 359 is in that depressed position, the rear end of the portion 367 is disposed in front of the #9 key stop lug 225 on the stop bar 223. That is, the stop lug which normally serves in divisive operations for adding nine in every order to the left of the units order where a cipher appears in the divisor. In the forward position of the lever 359, the forward edge of the portion 367 is in contact with the end of its guide slot 372. Thus with the levers 359 in the forward and depressed position the lower portions 371 are respectively disposed between the forward ends of the slots 372 in the key plate 39 and the front or forward edges of the stop lugs 225. In such position each lever 359 prevents movement of the negative stop bar 223.

Figure 1:
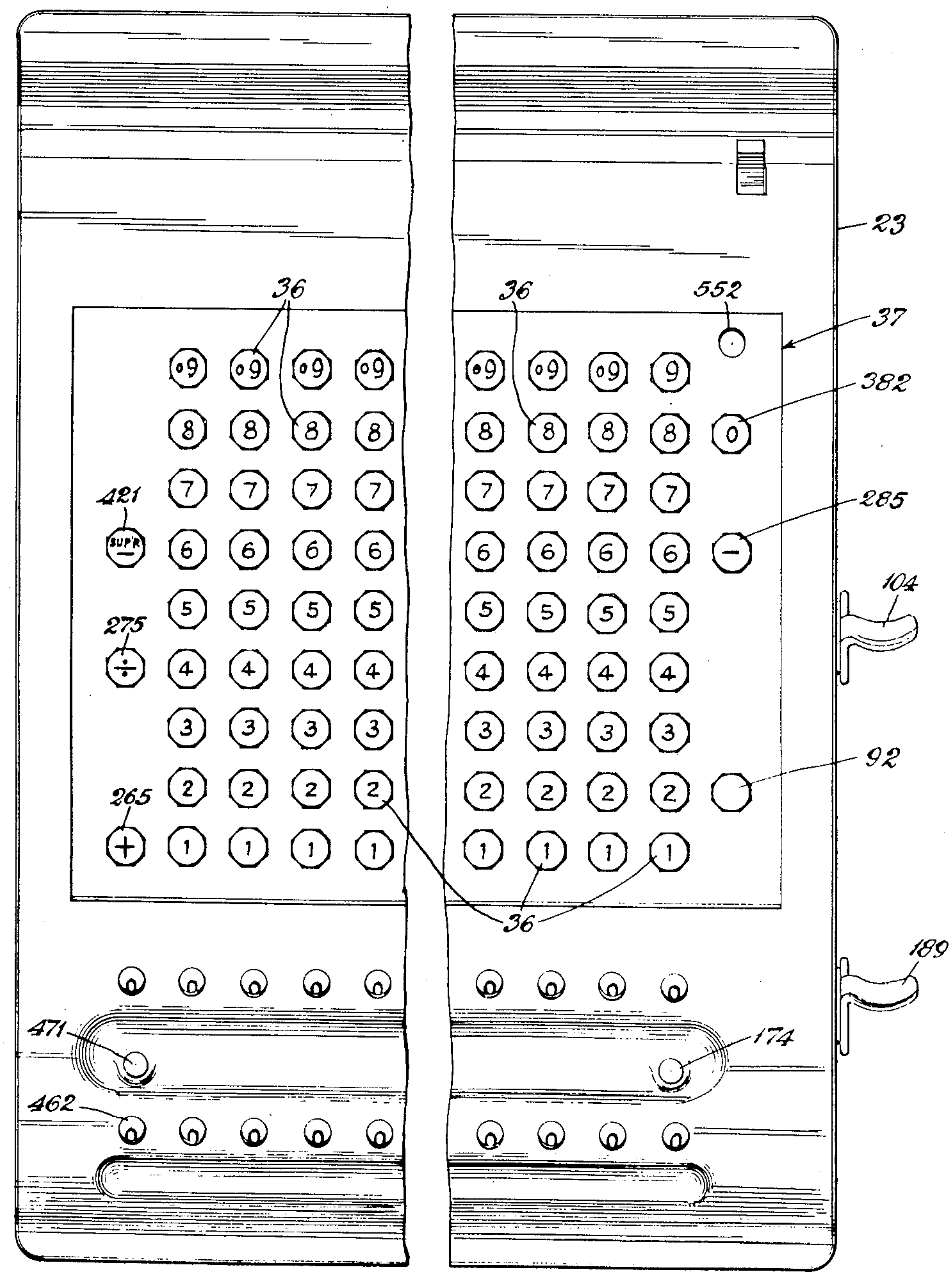
Figure 1 is a top plan view of a super-totalizer type of calculating machine embodying the invention and shows a suitable arrangement of several denominational orders of digital keys and the control keys for presetting the machine for the various forms of calculation.

As already explained, in subtraction as performed by this machine, when a cipher occurs in the first or units order, the equivalent of ten is added in that order to set up action therein and to provide continuity of action throughout the other orders. To accomplish that, a key 382, marked with a cipher and sometimes hereinafter called the cipher key because it represents a cipher in subtraction in the units order, is provided with a stem 383 (Figs. 10 and 11) which extends downwardly through the keyboard 37 and contacts a horizontal lip 384 on a rearwardly extending arm 385 of a lever 386. That lever is mounted on a stud or short shaft 387 fixed in the partition plate 34 at the right side of the machine and the cipher key 382 is mounted to the right of the #8 key between the right support plate and the first partition plate 34, as indicated in Fig. 1.

As shown in Fig. 11, the lever 386 is associated with a spring 388 on the shaft 387, the spring having an end extending under a pin in the lever arm 385 and its other end extending under a pin anchored on the outside or right support frame plate. The lever 386 is provided with a downwardly extending arm 389 offset to the left and projecting through an opening in the framework into the units order space between the frame plates where that arm is pivoted to a link 391. The forward end of the link 391 is attached to a lever 392 pivoted on the shaft 328 in the units order. That lever 392 as shown in Fig. 11 is like the upper part of the levers 341 (Figs. 15 and 16) except that it is provided with an extension 393 at its upper end to hold the stud to which the link 391 is attached. Like the levers 341, the lever 392 bears against the stud 331 of the power trip bar 51.

With such a construction, depression of the key 382 will cause its stem to depress the rearwardly extending arm 385 of the lever 386 and cause the downwardly extending arm 389 of the lever 386 to thrust the link 391 toward the front of the machine. The forward movement of the link 391, through the upper extension 393 of the lever 392, is transmitted to the stud 331 of the bar 51 as is any key action in the units order when the subtraction key 285 is in depressed position. In this case, however, no provision is made for stopping the units order mechanism. To the contrary, novel means in provided to allow the actuating mechanism in that order to move the sector 61 far enough to add ten under a power actuation instead of moving it the normal amount to add nine as in the other orders to the left.

Assuming by way of example that a total of 83,241 has been accumulated or set up in the primary register and it is desired to subtract from that number or total, say 4,650. The operator after setting the subtraction key 285 strikes the #4 key in the thousands column, the key #6 in the hundreds column, the #5 key in the tens column and the cipher key 382 instead of a digital key in the units column. Depression of the cipher key initiates the calculating operation already described, resulting, in the assumed example, in the addition of ten (for the zero or cipher of the subtrahend) to the 1 in the units column in the minuend which is the equivalent of subtracting the zero in that order of the subtrahend from the 1 in that order of the minuend, giving in either case 1 in the units order of the difference or answer. A carry, however, takes place in view of the addition of ten in the units order, adding 1 to the tens order. The co-digital amount added from the depression of the #5 key in the tens order is 4 plus the carry from the lower order, making 5 which is added to the 4 of the assumed minuend, giving 9 with no carry to the hundreds order. In the hundreds order the co-digital amount of 6 resulting from the depression of the #6 key is 3, which added to the 2 in that order of the minuend makes 5 with no carry to the thousands order. The key #4 having been depressed in the thousands order results in the addition of the co-digit of 4 which is 5, plus the 3 in the thousands order of the assumed minuend makes 8 without a carry into the ten-thousands order. In the ten-thousands order of the assumed minuend there is an 8. Since the assumed subtrahend has no digital value in that order no key was set therein, hence a 9 is automatically added to the 8, changing the reading to a 7 in that order and carrying 1 to the next higher order. The 1 carried to that next higher order with the 9 automatically added to that order leaves a cipher and a carry of 1. The automatic addition of 9's to the 1 carried from the next lower order is automatically repeated in each order to the left except the overflow order.

To prevent the carry from taking place in the overflow order whereby the answer in the assumed example will be registered as 78,591, the mechanism disclosed in United States Letters Patent No. 2,287,151, issued June 23, 1942, is used. Such mechanism comprises means for throwing out the carrying pawl 76 and latching it out until after the carrying operation. When the carry operation is completed, the carrying pawl 76 is automatically unlatched and is again ready for a carrying operation (Fig. 30).

As shown in Fig. 30 and as more fully described in the last mentioned patent, the carrying pawl 76 is associated with a carry cut-out lever 394 pivoted on a short shaft 395. That carry cut-out lever 394 includes a pawl operating arm 396, extending forwardly under a lateral extension 397 on the front end of the carrying pawl 76, an upstanding lever operating arm 398, and an unlocking pin 399 carried by the pawl operating arm 396. When rotated in a clockwise direction (Fig. 30), the pawl operating arm 396 of the carry cut-out lever engages the lateral extension 397 on the front end of the carrying pawl 76 and rotates the pawl in such a direction as to move the acting end 77 thereof downwardly and out of engageable relationship with the pins of the combined lantern wheel and accumulator gear 65. In that position the carrying pawl 76 will not produce a carry. The carry pawl is adapted to be releasably locked in that position by a spring pressed latch 401 pivoted on the carrying lever 75.

For so rotating the carry cut-out lever 394 to move the carrying pawl 76 to such position, a link 402 is pivotally connected to the upstanding lever operating arm 398 and rearwardly thereof to a downwardly extending arm 403 of a lever 404 mounted on the shaft 328. The lever 404 is associated with a hooked dog 405 (Fig. 29) similar to the hooked dogs 338 in the other orders throughout the machine. Like those other hooked dogs 338, the hooked dog 405 is unlatched by the latch 335 from a lower order allowing the hooked dog 405 to rise and latch over the pin 339 in the guide arm 53 of the highest denominational order in the machine.

Upon seriatim operation of the machine automatically resulting as already described from the depression of a digital key in the units order during subtraction as nine or any figure of the subtrahend is added in the highest denominational order, the hooked dog 405 engages the pin 339 in the guide arm 53. In moving rearwardly with the guide arm, the hooked arm 405 swings the lever 404 rearwardly, carrying with it the link 402. The rearward movement of the link 402 is transmitted to the lever operating arm 398 which rotates the lever 394 on its pivot to clear the carrying pawl 76 from its carrying position relative to the pins of the combined lantern wheel and accumulator gear of the overflow order. Thus during subtraction the carry of a ten into the highest denominational order and the adding of nine in that order producing ten does not affect the overflow order of the primary register.

Even with a series of 9's standing in the primary register, the carrying pawl will be latched out prior to the 10's transfer action in the highest order, because of the manner in which these two different functions are initiated, and this does not depend on the speed of propagation of the transfers across the orders relative to the speed of seriatim initiation of power actuation across the orders. If the basic operation of the actuating mechanism of the instant machine is borne in mind, it will be recalled that a full rearward stroke of the power operated mechanism (including the clutch hook 52, guide member 53 and actuating link 58), which includes a downward movement of the associated gear sector or actuating segment 61, will take place before any resulting actuation is imparted to that denominational order of the accumulator. In other words, the accumulator is actuated only upon upward movement of its gear sector 61 effected by the calculating spring 57 in returning the power actuated parts to normal position following automatic release of the clutch hook 52 from the toothed wheel 54. It will also be remembered that in all of these machines, as is well-known by anyone skilled in the art, "duplex" operation is enabled by preventing 10's carrying or transfer operations into any denominational order in which the segment lever or gear sector 61 is out of its normal position. Consequently, a 10's transfer initiated in a lower order is automatically held in abeyance or delayed until the actuating mechanism of the next higher order, if then out of normal position, is returned to such normal position.

The seriatim power actuations across the several denominational orders initiated by depression of a digital key in the units order in a subtraction operation are effected by the power operated or rearward movement of the several guide members 53 in the instant machine. Such movement of the guide member 53 in the 10's order is initiated prior to completion of the power stroke in the units order. Consequently, any transfer or carrying operation initiated in the units order will be delayed until completion of the actuating operation in the 10's order. This sequence of operation takes place from lower to higher order completely across the machine. Therefore, any 10's transfer operation initiated from the next to the highest order into the highest order cannot take place until after completion of the power actuation in the highest order, and since the carrying pawl 76 of the highest order is rendered inoperative by such power actuation in that order, any 10's transfer into the highest order, or from that order to the overflow wheel, cannot take place until after the carrying pawl 76 of the highest order has been latched in inoperative position.

From the foregoing description it will be understood that, to perform subtraction, it is only necessary to strike the subtraction key whereby to preset the machine for subtraction and then to depress the uni-marked digital keys corresponding to the subtrahend whereby to set the subtrahend on the keys. If there is a figure in the rightmost or units order it is only necessary to strike the key bearing that figure in the units order. If a cipher occurs in the units order of the subtrahend, however, it is necessary to strike the cipher key instead of striking a digital key in the units order. All other ciphers appearing in the subtrahend are ignored. The mechanism so set by the subtraction key is automatically cleared during the power action that takes place seriatim in the various orders of the machine. It has already been explained how the spring pressed dogs 313 are relatched in their normal position by their latch levers 308 as action takes place in each order. The clearing of the toggle action which holds the digital control of the machine set for negative actuation already described as being made up while the transordinal rock shaft 243 is being set, will now be described.

Figures 29, 31:
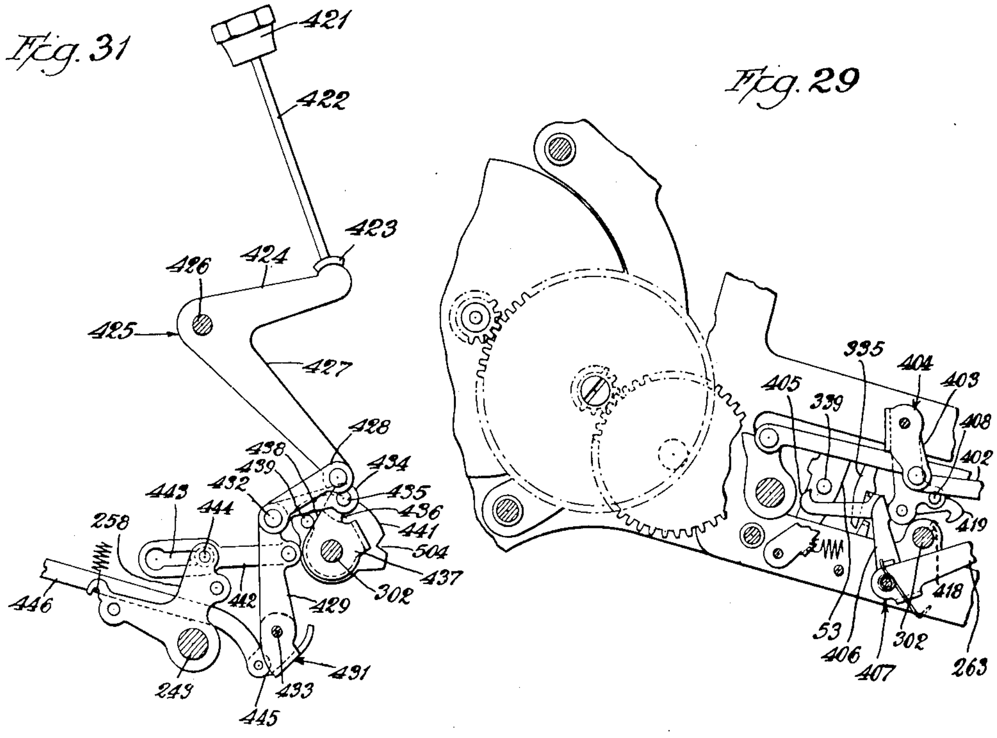
Fig. 29 is a cross-sectional detail view of a portion of the machine and shows a means for reconditioning the machine for additive actuation.
Fig. 31 is a detail view of the super-totalizer control key and associated mechanism.
Figure 2:
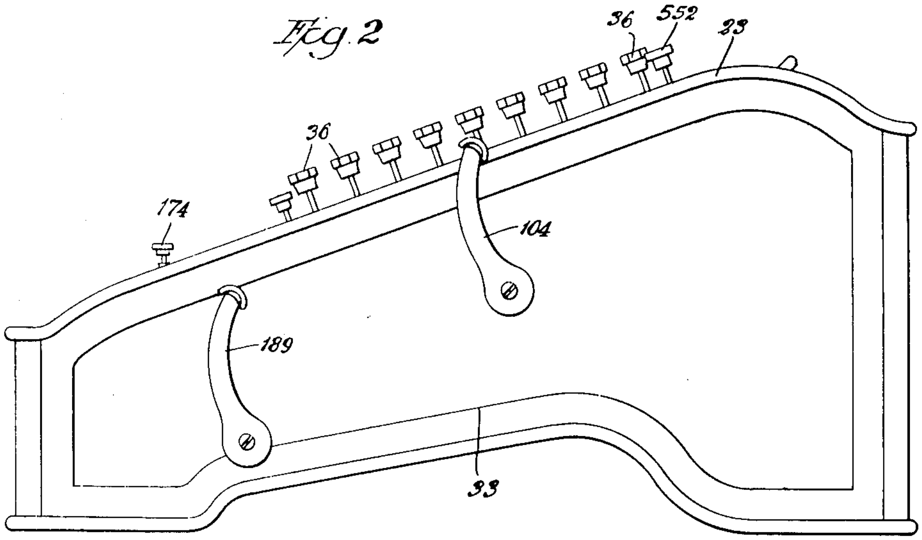
Fig. 2 is a side view of the machine shown in Fig. 1.

It will be remembered in connection with Fig. 22 that, in making up the digital control toggle 261, 263 when the machine is set for negative calculation, the lever arm 263 is rotated in a clockwise direction. That lever arm 263 is integral with an upwardly extending arm 406 and with it forms the digital control toggle lever designated for convenience by the reference character 407. As the lever arm 263 rotates in a clockwise direction as just mentioned, the upwardly extending arm 406 rotating therewith is moved forwardly into the path of a pin 408 on the lever 404 (Fig. 29). When the lever 404 is drawn rearwardly by the hooked dog 405 during a power action as already described, the pin 408 engages the lever arm 406 in its forward position and swings that arm 406 rearwardly, which rotates the toggle lever 407 counter-clockwise sufficiently to break the digital control toggle 261, 263.

The toggle will be broken above its center by such action and the spring 274 tends to break the toggle to the position shown in Fig. 22, wherein it is illustrated as being set for adding actuation. Such action, however, would be premature as the consequent shifting from negative digital control to positive digital control would be occurring while an actuation in the highest order is taking place. That would result in an error.

To avoid that, before the toggle 261, 263 is broken by the pin action just described, a pin 409 (Fig. 22) projecting leftward from the actuating link 58 in the highest denominational order moves rearwardly with the link 58. In moving rearwardly the pin 409 disengages an upwardly extending arm 411 of a latch lever 412 pivoted on a cross-rod 413 and urged in a counter-clockwise (Fig. 22) direction by a spring 414. The latch lever 412 is provided with a latch arm 415 having a shoulder 416 which, as the latch lever 412 is swung in a counter-clockwise direction by the spring 414, cooperates with a bent lip 417 at the free end 277 of the toggle lever arm 263 to prevent the toggle 261, 263 from completely breaking until shifting from negative digital control to positive digital control is complete.

Thus the latch arm 415 swings rearwardly to present itself as a block to full breaking movement of the toggle lever arm 263 by intercepting the upwardly moving bent lip 417. That prevents the center pivot 262 of the toggle 261, 263 from moving any more than slightly above the centers 259, 264, which is not enough to disturb the negative setting. When, however, the power action in the highest order is completed the pin 409 returns forwardly to its normal position. During its return movement the pin 409 operates the latch lever 412 to remove the shoulder 416 from blocking engagement with the bent lip 417. Thus the toggle lever 263 is released and the full breaking of the toggle 261, 263 is accomplished by the pull of its spring 274. In that manner the stop bars are reset for positive actuation or actuation in addition or multiplication.

The transordinal rock shaft 302 as shown in Fig. 29 carries a flat lug 418 fixed thereon just inside of the frame plate forming the partition between the last denominational order and the overflow order. At its forward end the hooked dog 405 has a hook 419. When the latch 335 releases the hooked dog 405 and it engages the pin 339, the hook 419 is depressed and, as the hook 419 moves rearwardly with the engaged hooked dog 405 and pin 339, the hook 419 engages the lug 418. The continued power action, transmitted through the guide arm 53 and the engaged hooked dog 405 and pin 339, pulls the lug 418 rearwardly and rotates the transordinal shaft 302 counter-clockwise as shown in Figs. 11 and 29 or clockwise as shown in Fig. 12. Such rotation of the shaft 302, through the link 298 and downwardly extending arm 293, returns the subtraction lever 289 to its normal position. As the subtraction lever 289 returns to normal position, it draws the link 294 rearwardly with it, moving the rear end of the slot 295 away from the pin 296 so that the arm 297 and the transordinal shaft 243 are free to rotate for a limited distance in a clockwise direction (Fig. 12) and will not interfere with the breaking of the toggle 261, 263, as already described.

As the downwardly extending arm 293 of the subtraction lever 289 is returned to its normal position, the link 381 pivotally attached to its lower end operates the crank arm 379 to rotate the transordinal shaft 377 clockwise (Fig. 24) sufficiently to release the levers 374 holding the spring pressed levers 359. When those spring pressed levers 359 are so released, they are returned to their normal rearward position by the springs 362 since the digital keys, having been previously cleared by the return of the power trip bars 51, have allowed any set spring pressed levers 359 to rise out of locking relationship with the respective stop bars 223. Thus, at the last power action takes place in the highest denominational order, the setting for subtraction is entirely cleared and the machine is automatically reset for addition and multiplication. As already stated, a key marked "SUP'R" with a subtraction sign below it is provided to the left of the keyboard to set the machine for subtraction from a number or answer registered in the super-total or secondary register. That key for convenience is now designated by the reference character 421. Subtraction from the super-total register is accomplished by setting up on the primary register a complement of the subtrahend to be subtracted from the minuend, which is a number or answer previously registered in the secondary or super-total register, performing a transfer of the complemental subtrahend from the primary register to the secondary register, and preventing a carry from taking place in the overflow order of the secondary register.

After the subtraction key 285 is depressed with the primary register clear, the setting up of the subtrahend on the keys will produce a complete component of the subtrahend which involves the setting of nine's in all orders, except that of the overflow wheel, of the primary register to the left of the highest figure of the subtrahend.

For example, if 4,650 is the subtrahend to be subtracted from the super-total register, the operator, after depression of the subtraction key 285, depresses the digital keys representing that subtrahend. In a ten-column machine, as a result of such key operation the primary register would read 9,999,995,350 which is the true complement of 4,650 for a ten-column machine that if added to any figure greater than the subtrahend, will give the correct subtraction. Since no figure on the overflow wheel of the primary register is transferable to the secondary register, the reading of that overflow wheel is immaterial.

In adding a full complement in complemental subtraction, there is a carrying of tens across the machine to the left. Where, as herein, an overflow wheel is employed, it is desirable to prevent a carry from taking place to the overflow wheel because the overflow order is not provided with mechanism to add nine's therein for entirely clearing the carry from the register.

As shown in Fig. 30, the super-total subtraction key 421 is associated with means for cutting out or preventing carries from taking place to the overflow wheel of either the primary register or the secondary register. As disclosed in that figure of the drawing the super-total subtraction key 421 is provided with a stem 422 depending through the plates of the keyboard 37 and engaging a horizontal lip 423 on a rearwardly extending arm 424 of a super-total subtraction lever 425. The lever 425 is pivoted on a stud 426 anchored in the framework of the machine and has a downwardly extending arm 427 to the lower end of which is pivoted a link 428 (Fig. 31). The link 428 extends forwardly from the arm 427 and at its forward end is pivoted to an arm 429 of a lever 431 by a stud 432. The lever 431 in turn is pivoted on a short shaft 433. The stud 432 also serves as a pivotal connection between the lever arm 429 and a link 434. The link 434 extends rearwardly from its stud connection with the arm 429 and is pivoted as at 435 to an arm 436 of a double-armed lever 437 having another arm 438 and mounted on the shaft 302.

That arm 438 is in contact with a pin 439 fixed in a centering disk 441 which is secured on the left end of transordinal shaft 302 for rotation therewith. That shaft 302, as already described, is one of the prime movers in presetting the machine for subtraction. When the key 421 is depressed the arm 424 of the lever 425 is swung downwardly and the lever arm 427 is swung forwardly carrying with it the link 428. Such movement of the link 428, transmitted through the arm 429, rotates the lever 431 in such a direction as to draw the link 434 forwardly. That link 434 during such forward movement, pulls the lever arm 436 forwardly, rotating the double-armed lever 437 on the shaft 302 in a counter-clockwise direction as disclosed in Figs. 30 and 31. The arm 438 of the double-armed lever 437, contacting the pin 439, rotates the centering disk 441 counter-clockwise. Thus the shaft 302, to which the centering disk 441 is fixed, is rotated in a counter-clockwise direction and performs the same train of functions as when similarly rotated by the subtraction key 285, as already described.

Pivoted to and extending forwardly from the arm 429 of the lever 431 is a slotted link 442 having in its forward end a slot 443 embracing a stud 444 fixed in the arm 258 on the transordinal rock shaft 243 of the digital control mechanism. Thus, as the lever 431 is rotated forwardly or counter-clockwise (Fig. 31), the link 442 moving therewith operates and pushes forwardly the stud 444 of the arm 258, thereby rotating the digital control shaft 243 in a direction to set the digital control mechanism for negative operation. The lever 431 is formed with a substantially U-shaped hub and is provided with a short arm 445 below the shaft 433. At its rear end a link 446 is pivoted to the arm 445 and extends forwardly therefrom, as best shown in Fig. 30. The forward end of the link 446 is pivoted at 447 to an upright arm 448 of a lever 449 which in turn is pivoted on a short shaft 451 supported by the framework of the machine.

The lever 449 is provided with a forwardly projecting arm 452 extending under a pin 453 fixed in a downwardly and forwardly extending link 454. The link 454 is provided at its upper end with a slot 450 embracing a stud 455, which slidably holds the upper end of the link against the left frame plate of the overflow section of the machine. At its lower end the link 454 is pivoted to a laterally offset or looped-up arm 456 of a carry cut-out lever 394' in the secondary or super-total register, the bottom of the loop being designated by the reference character 457. The lever 394' is pivoted as at 395' to the framework of the machine. The arm 456 of the lever to which the link 454 is pivoted is so offset from the main portion of the lever 394' that the main portion of that lever is spaced from the left frame plate of the section wherein the link 454 is located and that the main portion of the lever 394' is in line with a lateral extension 397' of the carrying pawl 76'. The lever 394' is provided with a spring 458 which normally holds it and the link 454 depressed as shown in Fig. 30. It will be noted that the lever 394' like the horizontal arm 396 of the lever 394 in the primary register extends forwardly under the lateral extension 397' of the carrying pawl 76'.

When the lever 431 is, as already described, rotated counterclockwise (Fig. 30), its lower arm 445 pulls the link 446 rearwardly rotating the lever 449 clockwise on its shaft 451. During such rotation of the lever 449, the lever arm 452 lifts the pin 453 and the link 454 with it, allowing the link 454 to slide upwardly on its stud 455. In moving upwardly the link 454 swings the lever 394' upwardly about its pivot 395' against the action of the spring 458, causing the free end of the lever 394' to contact the front end of the carrying pawl 76' and to move it in a direction to swing the engaging end 77' of that carrying pawl outwardly from between the pins of the lantern wheel and accumulator gear 65' in the overflow order of the secondary or super-total register. In that position the carrying pawl 76' is releasably locked by a latch 401' provided for that purpose. It will be noted that the carry cut-out means just described is similar to that used for the primary register overflow wheel and that covered in the aforesaid Patent No. 2,287,151.

It will be observed that, as the complement of the subtrahend set up in the primary register is transferred to the secondary register, the carrying pawl 76' in the highest actuated order of the secondary register will be operated but will perform no carry-over in the overflow order. The carrying pawl 76' having been latched out will swing rearwardly as usual, its latch 401' contacting with an unlocking pin 399′ so located in the lever 394′ as to release the latch 401′ from the carrying pawl 76′ while in its most rearward position, thus leaving the carrying pawl in position to perform a carry during a succeeding operation.

In such a machine the depression of the super-total subtraction key 421 is independent of the actual and final operation of adding the complement of the subtrahend into the secondary or super-total register. After such operation of the key 421, unless followed by a transfer operation, the carrying pawl 76′ might be left in its latched out position. To avoid that a visible signal is provided to warn the operator when the machine is set for super-total subtraction and when the carry to the overflow wheel has been set for such operation. That novel visible signal comprises a shutter 459, distinctively colored, for example, red, forming a signal hood over a portion of the overflow wheel and pivoted on the numeral wheel shaft 72′. The shutter 459 is normally held in the position disclosed in Fig. 30 by a spring 461 and is adapted to swing forwardly under a sight aperture shown at 462 for the overflow wheel of the super-total register. The spring 461 yieldably holds the shutter 459 rearwardly out of registration with the aperture 462 and in that position a pin 463 in a short arm 464 on the left side of the shutter bears against a lug or projection 465 formed on the forward edge of the link 454 about opposite the actuating pin 453 of that link.

On the right side below the pivot shaft 72′, the shutter 459 is provided with a latch lug 466 adapted to cooperate with a tooth 467 on a pivoted latch lever 468 for latching the shutter forwardly in its indicating position. The latch lever 468 is normally held in a horizontal position by a spring 469 and is depressible by the latch lug 466, as the shutter 459 is swung forwardly until the latch lug 466 escapes rearwardly beyond the tooth 467. When that occurs the spring 469 moves the latch lever to its locking position where the lever releasably latches the shutter 459 forwardly under the aperture 462 so that in place of a figure or a cipher appearing in the aperture of the overflow wheel a red signal discloses that the machine is set for subtraction from the super-total register.

When the super-total subtraction key 421 is depressed the link 454, as already explained, is raised by the action of the lever 449. In moving upwardly with the link 454 the lug 465 thereon engages the pin 463 in the arm 464 at the left side of the shutter and moves that pin 463 in a direction to swing the shutter 459 forwardly in a counter-clockwise direction (Fig. 30) sufficiently to move the shutter to indicating position relative to the aperture 462 and to move the latch lug rearwardly into latching engagement behind the latch tooth 467.

As will be remembered from the description of the automatic subtracting mechanism either the super-total subtraction key 421 or the subtraction key 285 will be cleared or returned to initial position by striking the cipher key 382 without disturbing the total in either the super-total register or the primary register. In the super-total register, however, the carrying pawl 76′ in the overflow order is latched out by depression of the super-total subtraction key and unless cleared the pawl 76′ will fail to carry if the next transfer made requires a carry to take place in that order. Such a condition is indicated by the red signal provided by the shutter 459.

To clear the latched out condition of the carrying pawl 76′, a key 471 serves, when depressed, to clear the latch 401′ for the super-total overflow carrying pawl 76′, allowing that carrying pawl to resume its normal carrying position. The key 471 is provided with a housing 472 made fast in the casing of the machine and with a stem 473 passing downwardly through the housing and contacting with a bent end 474 of a plunger 475. The plunger 475 is mounted for limited up and down movement by an upper slot 476 therein embracing a stud 477 and a lower slot 478 embracing a short shaft 479. The stud 477 through the upper slot 476 has a head (not shown) which slidably holds the plunger 475 against the right side of the inner frame plate forming the space for the mechanism of the overflow order. The short shaft 479 through the lower slot 478 passes through and is supported by the frame plates of the overflow order.

A pin 481 is fixed in the plunger 475 just below the upper slot 476. The pin projects to the left from the plunger sufficiently to extend over the free end of the latch lever 468 and is so arranged that when the plunger 475 is depressed by the key 471 the pin 481 swings the latch lever 468 downwardly. In swinging downwardly the latch lever releases the latched lug 466 of the signal shutter 459. When so freed or released, the latch lug 466 is returned forwardly to its normal position of Fig. 30 by the spring 461. In moving forwardly the lug 466 rotates the signal shutter 459 rearwardly or clockwise to its original or cleared position, thus clearing the shutter and returning it to the position where its pin 463 is again engageable by the projection 465 of the link 454 for another setting operation when the super-total subtraction key is again depressed.

Fixed in a forward projection at the lower end of the plunger 475, a pin 482 projects to the left into a jaw 483 of a lever 484. The lever 484 is pivoted on the short shaft 479 on which the plunger 475 operates, as already described, and has a folded hub 485. From the right section of the lever hub 485, the jaw 483 projects and a main lever arm 486 projects upwardly and rearwardly from the left section of the folded hub 485. At its upper end the main arm 486 is provided with a bent lip 487 extending to the left sufficiently to contact the latch 401′ when the lever 484 is swung counter-clockwise.

Thus as the key 471 is depressed the plunger 475 is moved downwardly carrying the pin 482 with it. The pin 482, in moving downwardly, throws the jaw 483 downward around the shaft 479, swinging the lever 484 counter-clockwise about the shaft 479. When the lever 484 is so operated the bent lip 487 contacts the latch 401′ of the carrying pawl 76′ and releases it so that it will return to its normal position as shown in Fig. 30 where it will be ready to produce carrying action.

Another means for clearing the carrying pawl 76′ and resetting the visible signal 459 to clear the sight aperture 462 is operable upon the clearing of the super-total register numeral wheels. For that purpose a hook 488 is pivoted at 489 to the lever 484. The hook 488, as shown in Fig. 30, is disposed in the path of a pin 491 located in an arm 204′ fixed to the super-total register clearing shaft 202. Thus when the clearing shaft 202 is rotated counter-clockwise (Fig. 30) in clearing the super-total register as already described, the pin 491 in the arm 204′ engages the hook 488 and draws it forwardly. In moving forwardly the hook 488 moves the lever 484 forwardly or counter-clockwise (Fig. 30), causing its bent lip 487 to operate the latch 401′ whereby to release or unlatch the carrying pawl 76′. The counter-clockwise rotation of the lever 484, transmitted through its jaw 483 and the pin 482, causes the depression of the plunger 475 and the latch lever 468, releasing the shutter 459 so that it returns to normal position, as shown in Fig. 30. In other words, the hook 488, operable by canceling or clearing mechanism of the super-total register, performs substantially the same function as does the push button or key 471. The hook 488 operates, however, in conjunction with the clearing of the super-total register, thus requiring only one manual operation to operate the hook and to clear or zeroize that register.

As already explained, the carrying pawl 76 in the overflow order of the primary register is also automatically locked out as the last power action takes place in the highest actuated denominational order or, in other words, in the order next to the right of the overflow order. It will therefore be understood that in setting, in the primary register, the complement for subtraction from the super-total register, the carrying pawl 76 will be automatically locked out. Since, however, that is only a complemental setting no carry will be effected between the highest actuated order and the overflow order to clear the latched out carrying pawl 76 in the primary register.

To clear that latched out carrying pawl 76, while a transfer to the secondary register or clearing action is taking place in the primary register, a lever 492 (Fig. 30) similar to the lever 484 is pivoted on a transordinal shaft 493. The lever 492 is provided with a bent lip 494 extending leftwardly sufficiently to contact the carrying pawl latch 401 and to disengage it from the carrying pawl 76 when the lever 492 is swung counter-clockwise, thus allowing the carrying pawl to return to its normal position of Fig. 30.

The means by which the lever 492 is so operated comprises a transordinal shaft 495 forming the center pivot for a rock frame toggle 496, 497 (Fig. 4) which, with the rock frame actuating shaft 153 and suitable connections including crank arm 498, a slotted link 499, and a zero stop lever 501, is included in the means for throwing the primary rock frame in and out as more fully described in the above mentioned Patent No. 2,063,962. The shaft 495 protrudes through a radial slot 502 in each of the frame plates and is connected with the lever 492 by a jaw 503. As the rock frame of the primary register is swung forwardly in either a clearing operation or a transfer operation, the shaft 495 is moved downwardly and forwardly in its slots 502 carrying with it the jaw 503 of the lever 492. The lever 492 is thus rotated in a direction to cause the bent lip 494 to engage and operate the latch 401 which thereupon releases the carrying pawl 76 and allows it to return to normal position.

In describing the novel digital control mechanism, the division key 275 and its operation to preset the machine for use in division was disclosed in detail. The operation of the #9 keys for division has been described in connection with automatic subtraction. The manipulation of the digital keys in performing division on the novel machine herein disclosed is substantially the same as disclosed in the aforesaid patents. The structural features indicated above and the uni-marking of the digital keys are, however, different herein. In performing division on the novel machine no dual marking of the keys is necessary except in the case of the #9 keys which are used for ciphers and for one's in division. Hence the #9 keys in the instant machine, as in the older "Comptometer" are marked with small ciphers.

The centering disk 441 (Fig. 32) as already explained is fixed on the transordinal rock shaft 302 and is located on the left side of the machine. For definitely determining the throw of the rock shaft 302, the disk 441 is provided with two notches 504 arranged in its outer edge and spaced apart to correspond with the opposite ends of the throw of the shaft. Those notches 504 are adapted to receive a V-shaped centering pin 505 of a centering lever 506 which is pivoted on the cross-rod 278 (Figs. 30 and 32). A relatively strong spring 507 encircling the cross-rod 278 urges the centering lever in such a direction as to maintain the centering pin 505 against the edge of the disk 441 while the rock shaft 302 is turning in either direction and to move the pin with considerable force into one of the notches 504 at the end of the limited rotation of the rock shaft in one direction and into the other notch 504 at the end of such rotation of the rock shaft in the other direction.

The lever 506 thus cooperates with the disk 441 to offer resistance against the turning of the rock shaft 302. The resistance is such as to require the deliberate exertion of extra effort to depress either the primary subtraction key 285 or the super-total key 421 whereby to assure the exertion of sufficient effort to finish the downward key stroke in either case. Since the pin enters one of the V-shaped notches 504 at the end of the downward stroke of either of those keys 285 or 421, an operator is reminded to use sufficient pressure in depressing the keys 285 or 421 and to make a complete stroke fully to set the key instead of only a partial stroke. The V-shaped notches 504 and the pressure of the centering pin 505 in them assure against displacement of the automatic subtraction devices by an accidental touch of the subtraction keys 285 and 421 and tend to prevent such devices from causing the shaft 302 to rebound out of its position at the end of the downward stroke of either such key, or when returned by power action in the clearing or zeroizing operation.

Another safety device serving to prevent errors in the automatic subtraction setting (Fig. 11) comprises mechanism for setting the error lock of the machine while the subtraction key 285 is being depressed and for releasing the error lock when the subtraction key is fully depressed. The error lock is fully described in United States Letters Patent No. 2,021,393, issued November 19, 1935, and 2,224,203, issued December 10, 1940. It is not, therefore, deemed necessary to repeat that description herein. Briefly, the error lock comprises a plurality of rockable lock dogs 508 (Fig. 3), each adapted when set to engage under a projection on a parallel motion bar 43, the lock dogs being movable to set position to prevent depression of all digital keys 36.

For setting the error lock while the subtraction key 285 is being depressed, the subtraction key stem 286 is provided intermediate its ends with a beveled projection 509 engageable, while the key is being depressed, with a cam shaped end 511 on an upwardly extending arm 512 of a lever pivoted as at 513 to the inner frame member at the right of the machine. That lever is also provided with a downwardly extending arm 514 which is engageable with a pin 515 in a link 516 forming a part of the control for the error lock and, as described in the patents just mentioned, adapted when moved rearwardly to set the error lock dogs 508 in locking position (Figs. 3 and 11).

As the key 285 is depressed, the beveled projection 509 of the key stem 286 moves the lever arm 512 about its pivot in a direction to move the lower lever arm 514 into contact with the pin 515 and thereby to move the link 516 rearwardly. As already stated, in moving rearwardly the link 516 sets the error lock dogs 508 so that none of the digital keys 36 of the machine may be operated. Thus, while setting the subtraction key 285, accidental depression of any of the digital keys 36 is prevented whereby to avoid the initiation of a power action until the presetting for the subtraction is completed.

To clear the error locks when the machine is completely set for subtraction, means, shown best in Figs. 3, 11 and 12, is provided like that fully disclosed in United States Letters Patent No. 2,018,933, issued October 29, 1935. It is more fully disclosed in Figs. 2 and 3 of that patent. The means employed herein comprises a lever 517 adapted to swing a trigger 518 fixed on a shaft 519 rearwardly into latching engagement with a latch arm 521 on a shaft 522. The trigger 518 in swinging rearwardly rotates the shaft 519 in a direction to move lugs 523 on the shaft 519 clockwise (Fig. 3), thus engaging all of the error lock dogs 508 and removing them from under the parallel motion bars 43, thereby unlocking the digital keys 36. The trigger 518 engaging the latch arm 521 releasably latches the error lock in that position. As in the patent last mentioned, a link 524 is connected with the zero lever 144 so that as the machine is cleared in a zeroizing operation by the zeroizing hand lever 104 the set locks will also be cleared. Pivotally mounted on the same stud by which the link 524 is pivoted to the lever 517 is a link 525 projecting therefrom forwardly and downwardly. At its lower end the link 525 is provided with a slot 526 co-acting with the stud 299 in the arm 293 of the lever 289 (Fig. 12). The slot 526 in the link 525 is so arranged, with relation to its connection with lever 517, that, just as the arm 293 reaches its limit of setting action responsive to the depression of the subtraction key 285, it will through its downward pulling action cause the link 525 to operate the lever 517, thereby clearing all the keyboard locks as described in the aforesaid Patent No. 2,018,933.

Another feature related to the same mechanism consists in locking the subtraction lever 289 against movement in the event of a partial depression of a digital key. In the present invention as shown in Fig. 12, the trigger 518 is provided with an extra arm 527 to which a link 528 is connected by means of a slot 529 in the link and a pin 531 fixed in the arm 527. The link 528 extends forwardly and is connected with a latch lever 532 pivoted as at 533 to the frame of the machine. The latch lever 532 at its upper end is adapted to be moved under a bent lip 534 of the subtraction lever 289 when the trigger 518 is operated by the lever 517 as already described. Thus after the lock dogs 508 are set, as a result, for example, of an error, the subtraction key 285 cannot be depressed until the error is corrected and the machine is cleared of its key locks. One means for clearing the lock dogs 508 and the latch lever 532 from locking engagement includes a release key 552 (Fig. 11) having a stem 553 depending through the keyboard 37. The stem at its lower end engages a lateral shelf 554 on the lever 517. The structure and operation of such means are fully described in the aforesaid Patent No. 2,018,933 and such description need not, therefore, be repeated herein. Briefly, however, when the release key 552 is depressed it operates the lever 517 to clear or to release the lock dogs 508.

It is important to prevent operation of the canceling or zeroizing mechanism, until the subtraction operation is completed, after the machine is set for subtraction by depression of the subtraction key 285, or, at least, until the depression of the digital keys 36 representing the subtrahend. To this end the forwardly extending arm 292 of the subtraction lever 289 (Figs. 10, 11 and 12) is provided with a bent lip 535. As the lever 289 is operated by the subtraction key 285, the bent lip 535 is elevated and, just before it reaches its uppermost position, it contacts a pin fixed in a full throw dog 536 for the zero lever 144 and tilts or rotates the dog 536 counter-clockwise as shown in Fig. 10 to a horizontal position where the dog will act to block or prevent the operation of the zero lever 144. Thus so long as the machine is set for subtraction, clearing or zeroizing operation may not be performed.

Another feature relative to the mechanism for preventing interference with subtraction once the machine is set therefor comprises a lock lever 537 (Figs. 30 and 32) mounted on a short shaft 538 supported in the framework of the machine. The lock lever 537 is provided at its lower end with a stud 539 extending into a slot 541 formed or otherwise provided in a link 542. The link 542 extends rearwardly from its connection with the lock lever and is connected to a stud fixed in the centering disk 441. As disclosed in Figs. 30 and 32, the upper end of the lock lever 537 is adjacent the lower end of the positive stem 266. When the shaft 302 is rotated counter-clockwise (Fig. 30) by the depression of the subtraction key 285, the centering disk 441, which is fixed on that shaft, moves in that same direction and moves the stud 543 forwardly. In moving forwardly, the stud thrusts the link 542 forwardly sufficiently to cause the slot 541 to release the stud 539 of the lever 537.

Arranged about the pivot shaft 538 is a spring 544, one end of which bears against the folded hub of the lever 537 and the other end of which projects downwardly and against a pin 545 anchored in the framework of the machine. That spring 544 causes the lower arm of the lever 537 to follow the slot 541 as the link is moved forwardly until the upper end of the lever 537 is moved rearwardly under the key stem 266. In that position the lever 537 serves as a lock against the depression of the positive key 265 until the lock lever 537 is released by the rocking of the shaft 302 during the clearing motion transmitted thereto when the machine is automatically reset for positive calculation after a subtraction setting.

To prevent the transfer key 92 from being cleared, when set for a transfer operation, until the primary rock frame is returned and the transfer gears 79 are disengaged from the gears 65' of the supertotal or secondary register, and to lock the transfer key against movement so long as the rock frame is latched out, after a clearing operation of the primary register, an L-shaped lever 546 (Fig. 10) is pivoted on a stud 547 which also is the pivot of the lock lever 105. The L-shaped lever 546 is provided with an upright arm 548 having at its upper end a bent lip 548' which projects to the right beyond the rear edge of the lock lever 105 and which is engageable therewith. The lever 546 is also provided with a forwardly extending arm 549 which at its forward end curves upwardly about the forward side of the rock frame actuating shaft 153. A pin 551 fixed in the actuating arm 152 of the shaft 153 contacts the free end of the arm 549 of the lever 546.

When a clearing or zeroizing operation is performed, the pin 551 depresses the arm 549 of the lever 546, causing the bent lip 548 to engage and move the lock lever 105 in a direction to move the lip 106 at the upper end of the lock lever into the lower notch 108 of the stem of the transfer key 92. That locks the transfer key 92 against action and holds it locked so long as the primary rock frame is out, or in the case of a simple clearing operation, until one of the digital keys 36 is depressed. When, however, the transfer key 92 is depressed and held down during a clearing or zeroizing operation in the primary register, the lip 106 of the lock lever 105 is moved into the upper slot 107 which will be in a position opposite the lip 106 when the transfer key is in its depressed position. Thus the lip 106 enters slot 107 and prevents the transfer key 92 from rising to its initial position until the rock frame actuating shaft 153 has returned to its initial position.

The shaft 153 returns to that position when the pin 151 under a power action breaks the toggle 145, 146 and the arm 164 draws the link 162 forwardly as already described. Such operation causes the arm 161 to rotate the shaft 159 in a direction causing the link action at its left end to break the rock frame detaining toggle 154, 155 and to allow the primary rock frame to return. The release or breaking of the rock frame detaining toggle (Fig. 30) permits the rock frame actuating shaft 153 to be turned clockwise and the pin 551 moving clockwise with the shaft 153 disengages and releases the arm 549 of the lever 546. That releases the lock lever 105 and allows it to move in such a direction as to remove its lip 106 from the slot in the transfer key stem and the primary rock frame returns its accumulator mechanism to the engaged relationship with its actuating mechanism thus disengaging the transfer gears 79 from the super-total accumulator gears 65'.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a power driven key-responsive calculating machine having an electric motor, denominational orders of digit keys, a primary and a secondary register, each said register having a plurality of denominational orders of numeral wheels, each of said wheels being actuatable by power derived from said electric motor, actuating mechanism operated by said electric motor to actuate the primary register wheels and digitally controlled by said keys, and clearing mechanism for individually zeroizing each said register; spring actuated devices energized by power from said electric motor for actuating the secondary register numeral wheels; normally inoperative means for connecting the numeral wheels of said primary register with the numeral wheels in the corresponding denominational orders of said secondary register in response to operation of said clearing mechanism for said primary register; and positioning means operable, before the primary register is cleared in a zeroizing operation, to render said normally inoperative means operative, to cause said devices to effect a transfer of the primary register reading to the secondary register during the zeroizing of said primary register in response to subsequent operation of said clearing mechanism for such primary register, and to cause said motor to reenergize said devices in preparation for another such transfer.

2. A power driven key-responsive calculating machine, comprising a primary register, a secondary register, each said register having denominational numeral wheels, motor means comprising a single source of power for actuating all of said numeral wheels, denominational orders of actuating mechanisms and digit keys for controlling actuation of the numeral wheels of said primary register by said motor means, clearing mechanism for zeroizing said primary register, normally inoperative spring actuated total transfer devices storing power for actuating the numeral wheels of said secondary register in accordance with the positions of the denominationally associated numeral wheels of said primary register to effect a total transfer operation, connecting means for effecting a connection between the denominationally associated numeral wheels of said primary and secondary registers to control a total transfer operation, and positioning means selectively operable to render said connecting means and said devices operative, before zeroizing of said primary register, to effect a transfer of the primary register reading to the secondary register in response to subsequent operation of said clearing mechanism and to effect reenergization of said spring actuated transfer devices by said motor means to store power for the next total transfer operation.

3. In a calculating machine according to claim 2, means for controlling the positioning means for rendering the connecting means and transfer devices operative so as to prevent certain ones of said connecting means and transfer devices from being rendered operative, whereby transfer of any values in predetermined denominational numeral wheels of the primary register is prevented during transfer of the values in the remaining denominational numeral wheels of the primary register to the secondary register.

4. In a calculating machine according to claim 3, a manipulative partial transfer control member selectively operable to render the controlling means operative or inoperative.

5. A key-responsive power driven calculating machine, comprising a primary and a secondary register, each having denominational orders of numeral wheels, motor means comprising a single source of power for actuating all of said numeral wheels, key-responsive mechanism for controlling actuation of said primary register, clearing mechanism or zeroizing said primary register, normally disconnected and inoperative connecting devices between said registers for controlling actuation of the secondary register in accordance with the registrations in the denominationally associated wheels of the primary register, auxiliary power mechanism for actuating said secondary register to add to any total therein the total of the primary register, means for moving all of said connecting devices into operative position before a clearing of said primary register is effected, and means for preventing movement of a predetermined number of said connecting devices into operative position by said last means for effecting a partial transfer of the total from the primary to the secondary register, whereby only the ordinal values of predetermined denominational orders of the primary register will be transferred.

6. In a calculating machine according to claim 5 manual means for controlling the means last recited therein and selectively operable to preset the machine for the taking of either partial or full total transfers.

7. In a key-responsive power driven calculating machine having a primary and secondary register, each including denominational numeral wheels, power storage means in the form of spring-actuated gear sectors operating upon pinion-activated ratchets for turning the numeral wheels of each said register in their accumulative actuation, motor power means for storing power in the springs of said gear sectors, automatic carrying mechanisms for each register, said carrying mechanisms including motor springs receiving power from the rotation of a lower numeral wheel and giving off power to the next higher numeral wheel in the carrying of the tens, zeroizing means for each register whereby the said carrying springs are utilized to return the numeral wheels to zero, a manual device for controlling each said zeroizing means means for selectively interconnecting said registers to control actuation of said secondary register in accordance with the registration of said primary register, auxiliary power mechanism interposed between said motor power means and the springs of the gear sectors of the secondary register, and manual means for controlling said auxiliary power mechanism so located relative to the primary register zeroizing device as to be operated in unison therewith.

8. A power driven key-responsive calculating machine having a primary and a secondary register, both power activated and each including denominational numeral wheels and automatic carrying mechanism therefor, said carrying mechanisms including a carrying spring in each denominational order of each register tensioned by the power actuation of its associated numeral wheel for imparting a unit actuation to the numeral wheel of the next higher order to effect a tens transfer and operable during a clearing operation to return its associated activating numeral wheel to zero, zeroizing means for controlling the clearing of said primary register by its said carrying springs, key-controlled power actuated mechanism for accumulatively actuating the primary register, normally inoperative transfer means between the said registers, positioning means for moving said transfer means to operative position whereby the numeral wheels of the two registers are so interconnected that, as the primary wheels return to zero, the corresponding numeral wheels of the secondary register may be accumulatively actuated in corresponding ordinal degrees to effect a transfer of any total in the primary register to the secondary register, and auxiliary power mechanism controlled by said zeroizing means in response to operation of said positioning means for accumulatively actuating the numeral wheels of said secondary register under such ordinal control of said transfer means and for correspondingly tensioning the carrying springs of said secondary register.

9. A calculating machine according to claim 8, wherein said auxiliary power mechanism comprises power storage means for storing power for effecting accumulative actuation of said secondary register, and means controlled by said zeroizing means for reconditioning said power storage means whenever the power stored therein has been diminished.

10. In a calculating machine according to claim 9, detent mechanism normally engaged with the secondary register to prevent actuation thereof by said auxiliary power mechanism and movable to inoperative position in response to operation of said zeroizing means following operation of said positioning means.

11. A calculating machine according to claim 10, including detent mechanism actuating means operable by said zeroizing means in timed relationship with respect to movement of said transfer means between operative and inoperative positions.

12. A power driven key-responsive calculating machine, comprising a single source of motive power, denominational orders of digit keys, a primary register, a secondary register, each said register having denominational numeral wheels, zeroizing means for individually clearing each said register, actuating means for said primary register receiving energy from said source of motive power in response to operation of said digit keys, and actuating means for said secondary register, comprising selectively operable control means including connecting means for effecting a connection between the denominationally associated numeral wheels of said primary and secondary registers to control a total transfer operation, and auxiliary power mechanism energized by said source of motive power in response to serial operation of said control means and said zeroizing means for said primary register.

13. A power driven key-responsive calculating machine, comprising a single source of motive power, denominational orders of digits keys, a primary register, a secondary register, each said register having denominational numeral wheels and automatic tens carrying mechanisms, zeroizing means for individually clearing each said register, actuating means for said primary register receiving energy from said source of motive power in response to operation of said digit keys, and actuating means for said secondary register to effect the transfer of the values registered in said primary register to said secondary register, comprising selectively operable control means including connecting means for effecting a connection between the denominationally associated numeral wheels of said primary and secondary registers to control a total transfer operation, and auxiliary power mechanism including a spring motor device associated with each denominational numeral wheel of said secondary register energized by said source of motive power in response to serial operation of said control means and said zeroizing means for said primary register to effect the zeroizing of said primary register and actuation of said secondary register in corresponding degree.

14. In a power driven key-responsive calculating machine having a single source of motive power, a primary accumulator, a secondary accumulator, each of said accumulators having register wheels and spring activated automatic carrying mechanisms operable to carry the tens from a lower to a higher order and also operable as power means to return the lower order wheel to zero, actuating mechanisms and digit keys for controlling operation of said primary accumulator, means including a zeroizing lever for effecting zeroizing of said primary accumulator, said secondary accumulator acting as a receiving means for totals from the primary accumulator to accumulate grand totals, the positioning of said accumulators being such that they are normally independent even while the primary accumulator is being zeroized; spring motor devices for each denominational order of the secondary accumulator providing power for actuating each said order, normally inoperative transordinal means receiving power from said source of motive power to energize said spring motor devices, normally inoperative connecting means for effecting a connection between the register wheels of said primary and secondary accumulators in corresponding orders to control a total transfer operation, and selectively operable manipulative means for rendering said transordinal means and said connecting means operative, whereby operation of said zeroizing lever following operation of said manipulative means engages said accumulators with each other and enables said spring motor devices to zeroize said primary accumulator and correspondingly actuate said secondary accumulator to transfer the total from said primary accumulator and to cause said transordinal means to reenergize said spring motor devices to ready the same for the next such total transfer operation.

15. A power driven key-responsive calculating machine, comprising motor means, denominational orders of actuating mechanisms and digit keys, a primary register having denominational orders of numeral wheels controlled by said actuating mechanisms and keys, a secondary register having denominational orders of numeral wheels which may be engaged with said primary register wheels, power storing secondary register actuators comprising a motor type spring for each said secondary register wheel, means for controlling said springs to prevent the same from unwinding until said primary and secondary register wheels are engaged, manual means for effecting independent zeroizing of said primary register, and selectively operable means for effecting engagement of said register wheels and release of the stored power in said secondary register actuators to bring about a transfer of a total from the primary to the secondary register and thereafter connecting said actuators with said motor means to rewind said springs to restore power in said secondary register actuators in response to subsequent operation of said manual means.

References Cited in the file of this patent

UNITED STATES PATENTS

| | | |
|---|---|---|
| 1,391,220 | Turck | Sept. 20, 1921 |
| 2,130,364 | Niemann et al. | Sept. 20, 1938 |
| 2,240,797 | Pasinski | May 6, 1941 |